United States Patent
Tanaka et al.

(10) Patent No.: US 8,030,812 B2
(45) Date of Patent: Oct. 4, 2011

(54) ROTATING ELECTRIC APPARATUS AND METHOD FOR CONNECTING STATOR COILS THEREOF

(75) Inventors: Yuichiro Tanaka, Hitachinaka (JP); Takashi Ishigami, Hitachinaka (JP); Kenichi Nakayama, Hitachinaka (JP); Yasuyuki Saito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 12/370,307

(22) Filed: Feb. 12, 2009

(65) Prior Publication Data

US 2009/0200888 A1 Aug. 13, 2009

(30) Foreign Application Priority Data

Feb. 13, 2008 (JP) .................................. 2008-031517
Oct. 24, 2008 (JP) .................................. 2008-274002

(51) Int. Cl.
*H02K 3/12* (2006.01)
(52) U.S. Cl. .......................................... 310/71; 310/201
(58) Field of Classification Search .................. 310/201, 310/208, 71
See application file for complete search history.

(56) References Cited

U.S. PATENT DOCUMENTS

| 2,407,935 A * | 9/1946 | Perfetti et al. ................. 310/201 |
| 6,201,332 B1 * | 3/2001 | Umeda et al. .................. 310/184 |
| 2006/0066167 A1 | 3/2006 | Saito et al. |

FOREIGN PATENT DOCUMENTS

| JP | 2004-80860 A | 3/2004 |
| JP | 2006-101654 A | 4/2006 |
| JP | 2006-288123 A | 10/2006 |

* cited by examiner

*Primary Examiner* — Dang D Le
(74) *Attorney, Agent, or Firm* — Crowell & Moring LLP

(57) ABSTRACT

Each pair of coils mutually connected in a stator winding is arranged in a fashion that a first coil of each pair of coils has an inner-circumferential-side coil terminal (212) led out from an inner-circumferential-side slot position in the direction of a coil end (220) of the stator winding, and that a second coil of each pair of coils has an outer-circumferential-side coil terminal (211) led out from an outer-circumferential-side slot position in the direction of the coil end (220) of the stator winding for connection to the inner-circumferential-side coil terminal (212), wherein there is provided a coil terminal connection structure in which the inner-circumferential-side coil terminal (212) is connected to the outer-circumferential-side coil terminal (211) across the coil end (220), and joint parts (211a, 212a) thereof are bent close to the coil end (220).

6 Claims, 17 Drawing Sheets

FIG. 6

ROTATING ELECTRIC APPARATUS AND METHOD FOR CONNECTING STATOR COILS THEREOF

BACKGROUND OF THE INVENTION

1. Field of the Invention

The present invention relates to a rotating electric apparatus such as a motor or generator, and a method for connecting stator coils thereof.

2. Description of the Related Art

The types of stator windings are generally classified into a concentrated winding arrangement and a distributed winding arrangement; in the former, coils are concentrated per magnetic pole tooth, and in the latter, coils are provided across a plurality of slots so that different-phase or same-phase coils are made to overlap one another at a coil end position. In the concentrated winding arrangement, although a small coil end of a stator can be provided which is advantageous for reduction in size and enhancement in performance of a rotating electric apparatus, a rotating magnetic field produced on the inner circumference of the stator is not evenly distributed, thereby bringing about a disadvantage that noise is prone to occur due to harmonics. By way of contrast, in the distributed winding arrangement adopted for a stator in conventional practice, it is generally possible to restrict a rotating magnetic field produced on the inner circumference of the stator within a substantially sinusoidal range for reducing noise to a lower level than that in the concentrated winding arrangement. However, in the distributed winding arrangement, since there is a significant extent of overlapping of coils at a coil end position, the volume of the stator is larger than that of the concentrated winding arrangement, giving rise to difficulty in size reduction and performance enhancement of a rotating electric apparatus.

For example, in the design of a main drive motor for an electric automobile, it is required to provide a high output by using a limited battery voltage under a considerably restricted condition on availability in mounting space. As a means for meeting requirements for extremely severe levels of compactness and high output, there is known a technique of increasing a coil space factor in a stator slot by using a copper element wire having a substantially rectangular cross section as a coil wire material. In a concentrated winding type of stator, a copper element wire having a substantially rectangular cross section is applicable relatively with ease since the configuration of each coil is rather simple. Earlier patent disclosures dealing with embodiments in which stator coils are structured in a concentrated winding form by continuously providing a copper element wire having a substantially rectangular cross section are found in patent documents 1 and 2 indicated below.

In cases where a copper element wire having a substantially rectangular cross section is used for each stator coil in a distributed winding form, it is required to circumvent possible occurrence of mutual interference on element wires while keeping the element wires in a proper alignment. As a conventional means for meeting this requirement, there is known a technique of providing a three-phase coil arrangement in a concentric winding form as disclosed in patent document 3 indicated below. In the coil end structure of the three-phase coil arrangement, U-phase, V-phase and W-phase members are stacked on one another axially without overlapping thereof, thereby preventing mutual interference on the members of three different phases.

Patent document 1: Japanese Unexamined Patent Publication No. 2004-80860

Patent document 2: Japanese Unexamined Patent Publication No. 2006-288123

Patent document 3: Japanese Unexamined Patent Publication No. 2006-101654

However, since the members of the three phases have different coil end configurations to prevent mutual interference on the element wires stacked at a coil end position, there is an inevitable disadvantage that the size of the entire coil end is rather large.

It is to be noted that the following aspects of the present invention concerning the problems to be solved by the present invention are also applicable to resolution of other problems that are critical in product manufacturing as will be described later.

SUMMARY OF THE INVENTION

It is therefore an object of the present invention to obviate the above-mentioned disadvantages by providing a rotating electric apparatus and a method for connecting stator coils thereof that enable enhancement in productivity, improvement in performance, and reduction in size.

According to a first aspect of the present invention, there is provided a rotating electric apparatus comprising: a stator having a stator winding comprising a plurality of coils connected in a plurality of slots formed in a stator iron core; and a rotor rotatably disposed in the inside of the stator; wherein each pair of coils mutually connected in the stator winding is arranged in a fashion that a first coil of each pair of coils has a top-side coil terminal led out from an inner-circumferential-side slot position in the direction of a coil end of the stator winding, and that a second coil of each pair of coils has a bottom-side coil terminal led out from a bottom-side slot position in the direction of the coil end of the stator winding for connection to the top-side coil terminal; and wherein a coil terminal connection structure is provided in which the top-side coil terminal and the bottom-side coil terminal are connected mutually across the coil end, and in which joint parts of the top-side coil terminal and the bottom-side coil terminal thus connected are bent so that the joint parts are disposed close to the coil end.

According to a second aspect of the present invention, there is provided a rotating electric apparatus comprising: a stator having a stator winding comprising a plurality of coils connected in a plurality of slots formed in a stator iron core; and a rotor rotatably disposed in the inside of the stator; wherein each pair of coils mutually connected in the stator winding is arranged in a fashion that a first coil of each pair of coils has a top-side coil terminal led out from a top-side slot position in the direction of a coil end of the stator winding, and that a second coil of each pair of coils has a bottom-side coil terminal led out from a bottom-side slot position in the direction of the coil end of the stator winding for connection to the top-side coil terminal; wherein a coil terminal connection structure is provided in which either one of the top-side coil terminal and the bottom-side coil terminal is extended through a coil-to-coil clearance on the coil end to a position of the other one of the top-side and bottom-side coil terminals, and the one of the top-side and bottom-side coil terminals thus extended is connected to the other one of the top-side and bottom-side coil terminals.

According to a third aspect of the present invention, there is provided a rotating electric apparatus comprising: a stator including a stator iron core that has a plurality of slots formed thereon, and a stator winding that comprises a plurality of coils held in the plurality of slots; and a rotor having a face opposed to a face of the stator iron core mutually, the rotor being held rotatably via an air gap so that a magnetic circuit is produced through which a magnetic flux is passed between the mutually opposed faces of the stator iron core and the rotor via the air gap; wherein each pair of coils mutually connected in the stator winding is arranged in a fashion that one of each pair of coils has a top-side coil terminal led out from a top-side slot position in the direction of a coil end of the stator winding, and that the other one of each pair of coils has a bottom-side coil terminal led out from a bottom-side slot position in the direction of the coil end of the stator winding for connection to the top-side coil terminal; and wherein either one of the top-side coil terminal and the bottom-side coil terminal is laid spiral-wise along the coil end to a position of the other one of the top-side and bottom-side coil terminals so that the one of the top-side and bottom-side coil terminals is connected to the other one of the top-side and bottom-side coil terminals.

According to a fourth aspect of the present invention, there is provided a rotating electric apparatus comprising: a stator having a stator winding comprising a plurality of coils connected in a plurality of slots formed in a stator iron core; and a rotor rotatably disposed in the inside of the stator; wherein each pair of coils mutually connected in the stator winding is arranged in a fashion that a first coil of each pair of coils has a top-side coil terminal led out from a top-side slot position in the direction of a coil end of the stator winding, and that a second coil of each pair of coils has a bottom-side coil terminal led out from a bottom-side slot position in the direction of the coil end of the stator winding for connection to the top-side coil terminal; wherein one of the top-side coil terminal and the bottom-side coil terminal is laid spiral-wise along the coil end of the stator winding, and an opening selected from a notch and a through hole is formed on a joint part of the one of the top-side and bottom-side coil terminals, and wherein the other one of the top-side and bottom-side coil terminals is bent radially across the coil end, and a joint part of the other one of the top-side and bottom-side coil terminals is engagedly connected to the opening formed on the joint part of the one of the top-side and bottom-side coil terminals.

According to a fifth aspect of the present invention, there is provided a rotating electric apparatus comprising: a stator having a stator winding comprising a plurality of coils connected in a plurality of slots formed in a stator iron core; and a rotor rotatably disposed in the inside of the stator; wherein each pair of coils mutually connected in the stator winding is arranged in a fashion that a first coil of each pair of coils has a top-side coil terminal fed out from a top-side slot position in the direction of a coil end of the stator winding, and that a second coil has a bottom-side coil terminal led out from a bottom-side slot position in the direction of the coil end of the stator winding for connection to the top-side coil terminal, wherein the stator winding is formed of a flat-type conductor wire material having a rectangular cross section, with a wide side face of the flat-type conductor wire material corresponding to the long side of the rectangular cross section, and with a narrow side face of the flat-type conductor wire material corresponding to the long side of the rectangular cross section, wherein one of the top-side coil terminal and the bottom-side coil terminal is laid spiral-wise along the coil end of the stator winding, wherein a joint part of the one of the top-side and bottom-side coil terminals is bent radially with respect to the stator, and wherein the other one of the top-side and bottom-side coil terminals is bent radially across the coil end so that the wide side face of the other one of the top-side and bottom-side coil terminals is connected to the narrow side face of the one of the top-side and bottom-side terminals.

According to a sixth aspect of the present invention, there is provided a coil connecting method for connecting stator coils of a rotating electric apparatus that comprises a stator having a stator winding including a plurality of coils connected in a plurality of slots formed in a stator iron core, and a rotor rotatably disposed in the inside of the stator, the coil connecting method comprising the steps of: providing a winding-around form of coil wire in a first pair of the slots, leading out a first coil terminal from a top-side position of the first pair of the slots in the direction of a coil end of the stator winding, providing a winding-around form of coil wire in a second pair of the slots, leading out a second coil terminal from a bottom-side position of the second pair of the slots in the direction of the coil end of the stator winding, and connecting the first coil terminal and the second coil terminal mutually across the coil end of the stator winding.

In accordance with the above-mentioned aspects of the present invention, it is possible to decrease a total coil height in a stator of a rotating electric apparatus for realizing reduction in size of the entire coil end.

As regards the following preferred embodiments of the present invention, it is to be understood that besides providing the above-mentioned advantageous features, the present invention can also solve other problems described below and provide advantageous effects as stated below. The problems and advantageous effects mentioned in the following description are of critical importance in product manufacturing. The preferred embodiments described below are based on deliberate examinations that have been conducted by the inventors of the present invention for the purpose of product commercialization, i.e., according to the present invention, it is possible to solve various critical problems and provide advantageous effects with respect to product commercialization in addition to the above-mentioned reduction of coil end size. These problems to be solved and the advantageous effects to be provided are treated hereinbelow.

The above and other objects, features and advantages of the present invention will become more apparent from the following detailed description with reference to the accompanying drawings.

BRIEF DESCRIPTION OF THE DRAWINGS

Figure 6:
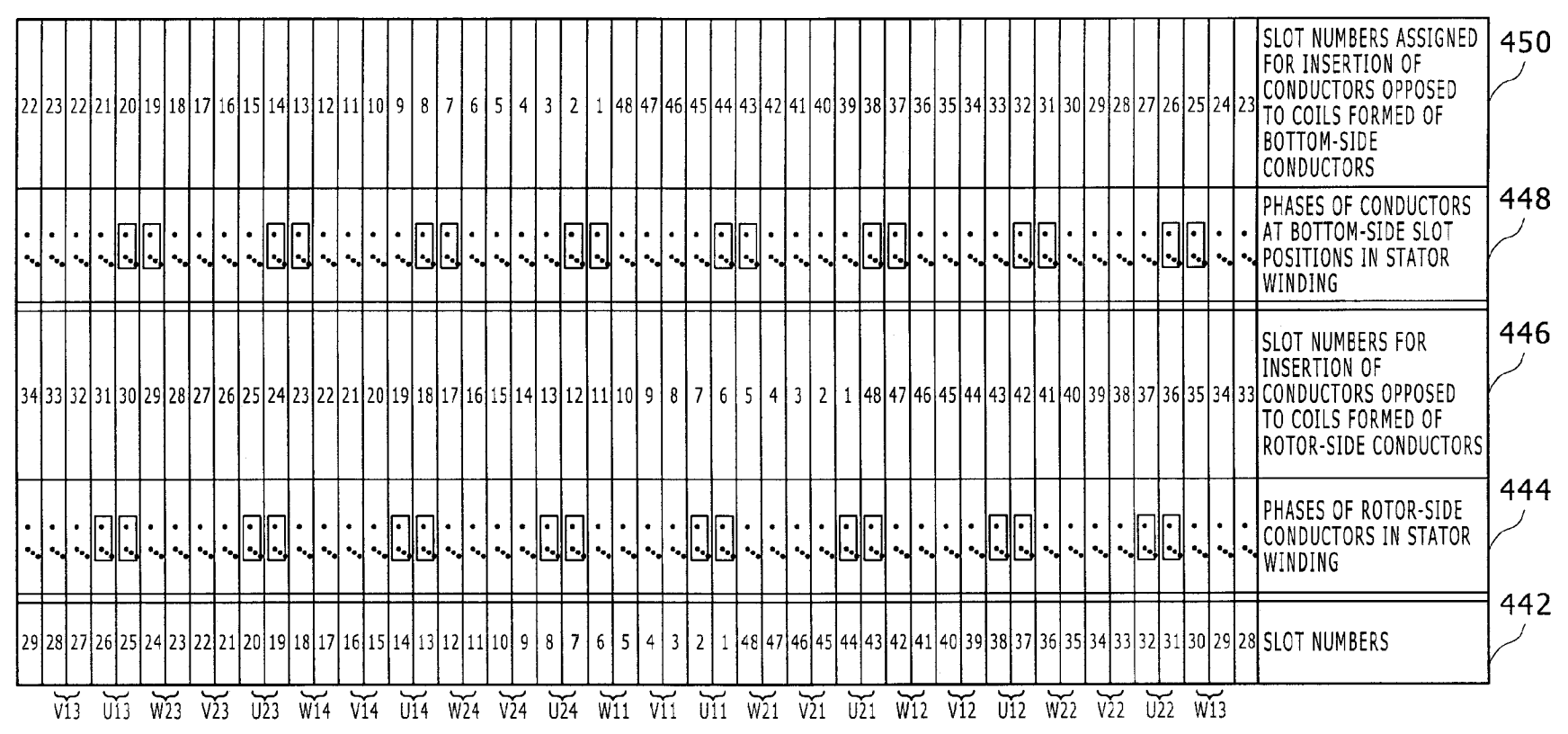

FIG. 6 is a diagram showing a positional relationship of slots 411 and coil parts constituting the stator coil 413;

DETAILED DESCRIPTION OF THE PREFERRED EMBODIMENTS

The present invention will now be described in detail by way of example with reference to the accompanying drawings. The following preferred embodiments of the present invention are applicable to resolution of the problems described below and provision of the advantageous effects mentioned below. Most of these problems to be solved and advantageous effects to be provided are different from those mentioned in the foregoing description though duplications in some aspects are included.

Figure 5:
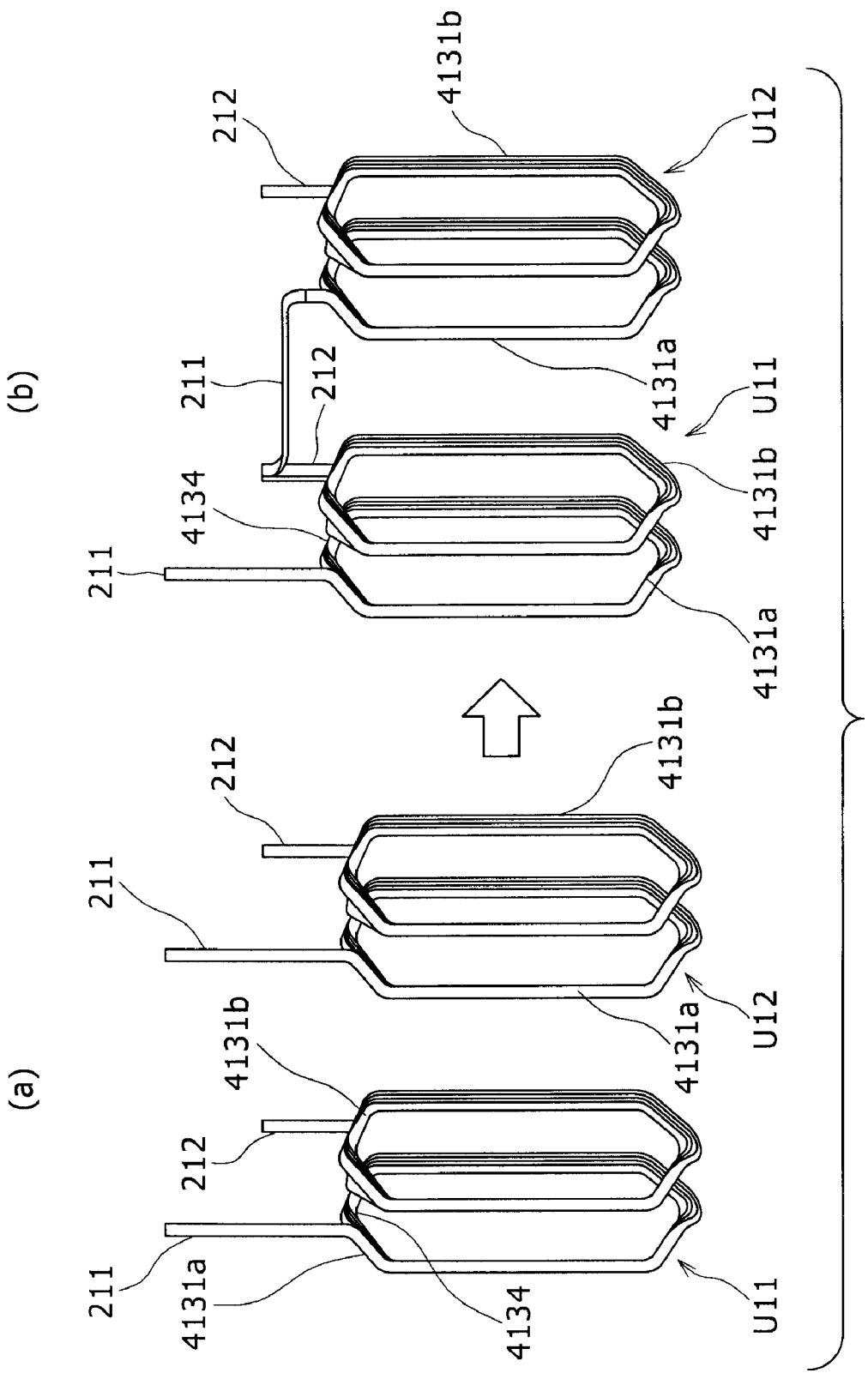
FIG. 5 is a detailed diagram of coils U11 and U12, showing an arrangement before joint connection in (a), and an arrangement after joint connection in (b)
Figure 7:
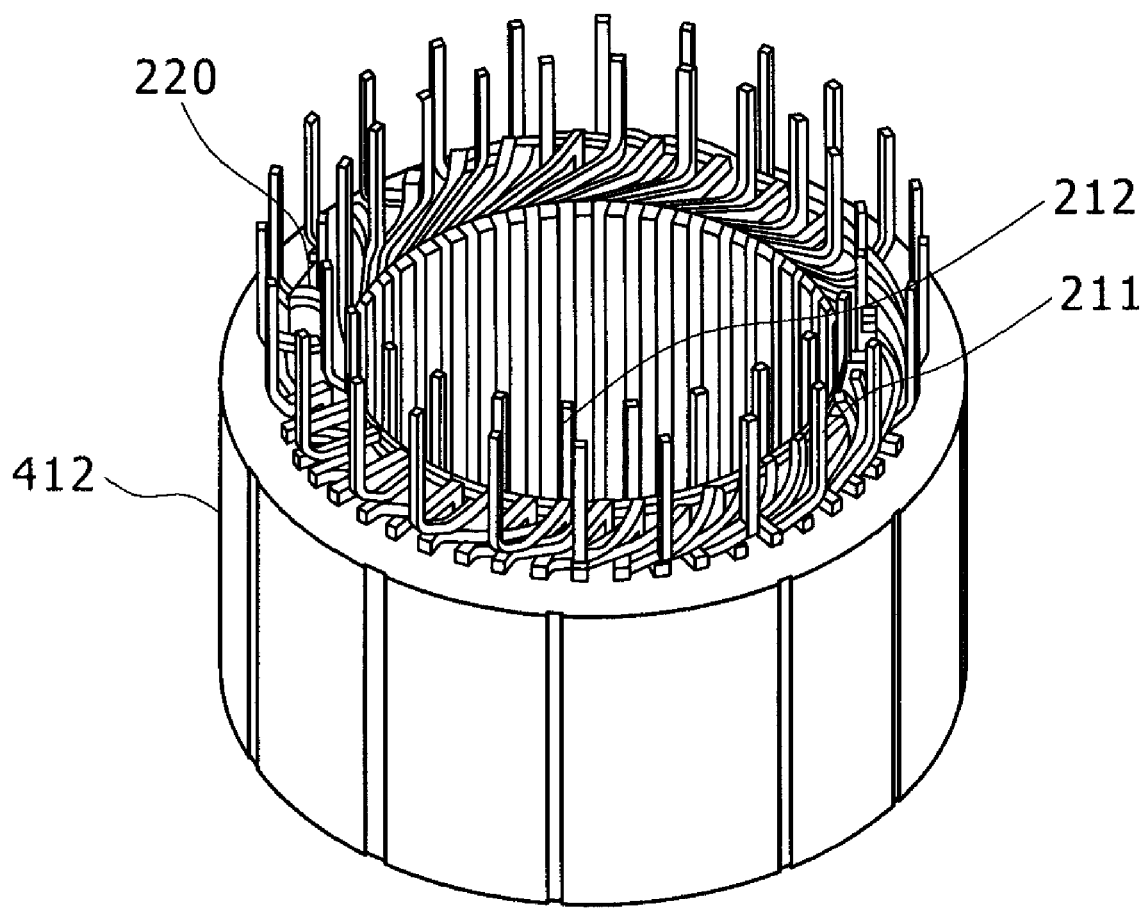
FIG. 7 is a perspective view showing coils formed in a stator iron core 412 before joint connection.
Figure 8:
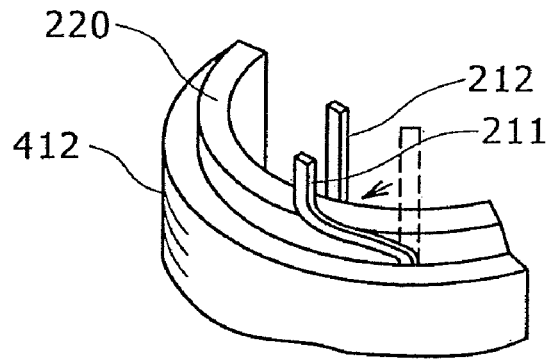
FIGS. 8(a)-8(d) are diagrams showing a first connection structure of conductor terminals 211 and 212.
Figure 8:
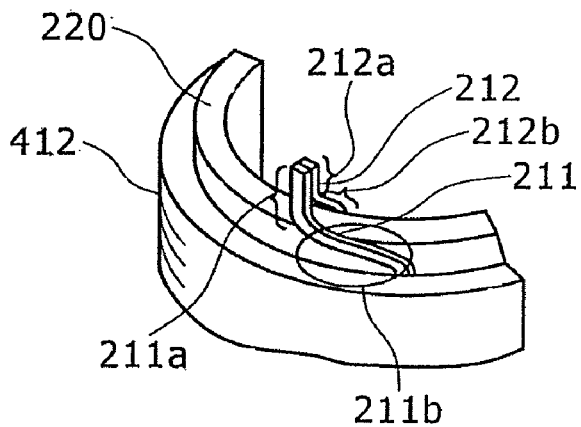
Figure 8:
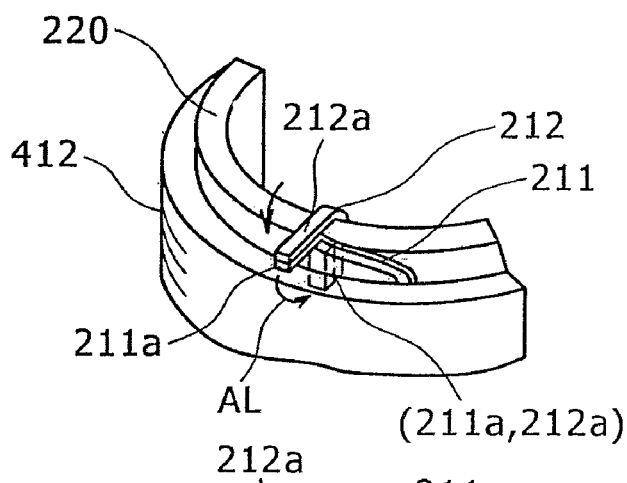
Figure 8:
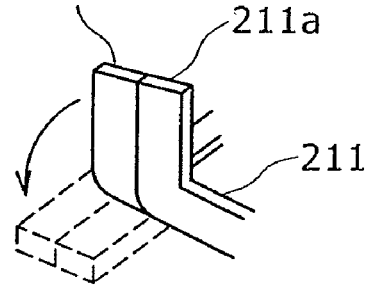

Enhancement in Productivity:

In the following preferred embodiments of the present invention, a coil formed of a single turn or plural turns of conductor wire as shown in FIG. 5 is used for a stator. Each coil comprises two insertion parts including a first insertion part and a second insertion part, for insertion into slots; and two coil ends including a first coil end and a second coil end, for connection of the first and second insertion parts. As illustrated in FIGS. 6 to 7, in a case where a first insertion part of a first coil is disposed at a depth position (bottom-side position) of a first slot for example, a second insertion part of the first coil is disposed at an opening position (top-side position) of a second slot. At an opening position (top-side position) of the first slot where the first insertion part of the first coil is disposed, there is located a second insertion part of a second coil. Further, at the depth position (bottom-side position) of the second slot where the second insertion part of the first coil is disposed, there is located a first insertion part of a third coil. In such a positional relationship of slots as mentioned above, a plurality of coils constituting a three-phase stator winding are arranged along the entire circumference of a stator structure.

Since each of the coils is made of a continuous conductor, there is no need to perform welding for connecting first and second insertion parts of each coil, for example, in coil formation. Hence, according to the preferred embodiments of the present invention, it is possible to enhance productivity of coils. In the preferred embodiments, the number of connection points is relatively small with respect to the entire structure of the stator winding, contributing to enhancement in productivity.

Further, as shown in FIGS. 5 and 6, there is provided a structural arrangement in which two coils to be used as a pair are allocated in adjacent slots, thereby allowing the formation of a pair of coils by using a continuous conductor. This structural arrangement can decrease the number of connection points in the entire stator structure, allowing enhancement in productivity. A decrease in the number of connection points leads to improvement in electrical characteristics to enable further reduction in size.

As shown in FIG. 5 and FIGS. 7 to 13, since joint parts of conductor terminals (indicated by reference numerals 211a and 212a, for example, in the drawing figures) are located at outside positions of first and second coil ends, it is rather easy to perform connection work in coil formation, resulting in an increase in productivity. Further, the entire stator structure is simplified to contribute to further reduction in size and improvement in reliability.

Moreover, joint parts of the conductor terminals are disposed on one side only at first and second coil ends in coil formation, contributing to improvement in productivity.

Improvement in Performance:

Each coil having first and second insertion parts is formed by providing a single turn or plural turns of conductor wire. By changing the number of wire turns, it is allowed to adjust the number of conductor layers stacked in the direction from an opening slot position to a depth slot position (in the radial direction of the rotating electric apparatus). More specifically, since there is provided a structural arrangement in which a first insertion part of each coil formed of a single turn or plural turns of conductor wire is disposed at a depth slot position (bottom-side slot position) and a second insertion part thereof is disposed at an opening slot position (top-side slot position), the number of conductor layers stacked in each slot can be adjusted as required in accordance with the number of wire turns meeting particular requirements for electrical characteristics. The structural arrangement mentioned above makes it possible to facilitate the provision of a rotating electrical apparatus having electrical characteristics suitable for particular application. It is to be noted that the above-mentioned structural disposition of coils is not disclosed in the patent documents 1 to 3 cited in the foregoing section BACKGROUND OF THE INVENTION.

As shown in FIGS. 5 and 6, there is provided a structural arrangement in which each same-phase part or each coil part corresponding to the same phase (e.g., U11, or each of U12, V11, and V12) comprises a plurality of coils, which are allocated in adjacent slots. In the plurality of coils allocated in the adjacent slots, a first insertion part of each coil is disposed at a depth slot position (bottom-side slot position), and a second insertion part thereof is disposed at an opening slot position (top-side slot position), thereby making it possible to improve performance as well as enhance productivity.

Reduction in Size:

While the present invention has been described with respect to reduction in size in the foregoing, the following aspects of the present invention can also lead to significant contribution to the realization of reduction in size of a rotating electric apparatus.

As shown in FIGS. 5 to 7, there is provided a structural arrangement in which each coil formed of a single turn or plural turns of conductor wire is used, the coil comprises first and second insertion parts for insertion into slots, and first and second coil ends for connection of the first and second insertion parts, and the coil is made of a continuous conductor. Since such a process as welding is not required for connection between the first and second insertion parts, the size of the coil itself can be decreased for size reduction of the stator, contributing to size reduction of the entire structure of a rotor.

Since a first insertion part of each coil is disposed at a depth slot position and a second insertion part thereof is disposed at an opening slot position, it is allowed to carry out coil formation by using a conductor having a substantially rectangular cross section. Accordingly, conductor layers can be stacked in the short side direction with respect to the substantially rectangular cross section of the conductor. The use of a conductor having a substantially rectangular cross section makes it possible to improve performance, and further by stacking conductor layers in the short side direction with respect to the substantially rectangular cross section of the conductor, i.e., by stacking conductor layer so that the long sides of the substantially rectangular cross sections of the conductor layers are arranged to face mutually, the size of the stator can be made smaller for reduction in size of the entire structure of the rotating electric apparatus.

With reference to the accompanying drawings, the following describes the best modes for carrying out the present invention, taking an induction-type rotating electric apparatus as an example. This type of rotating electric apparatus, which is adopted for a drive system of a hybrid automobile or the like, provides a drive motor function for wheel driving and a generator function for generating electricity. The induction-type rotating electric apparatus is used for stating an internal combustion engine from a stopped state, generating a partial motive torque power for vehicle running in combination with the internal combustion engine, or generating a whole motive torque power for vehicle running without activating the internal combustion engine, for example.

Figure 1:
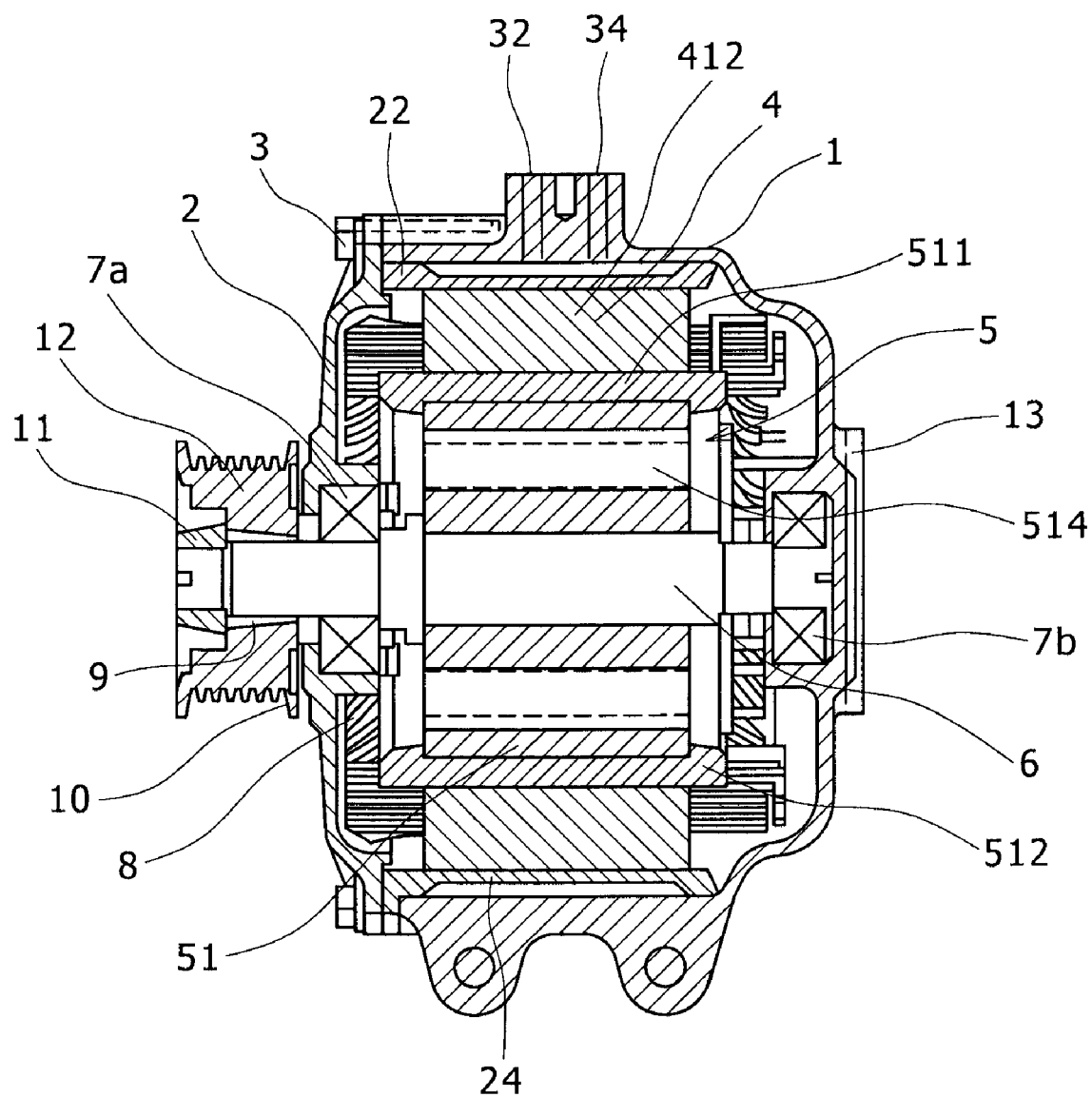
FIG. 1 is a sectional side view showing an induction-type rotating electric apparatus in a preferred embodiment of the present invention.
Figure 2:
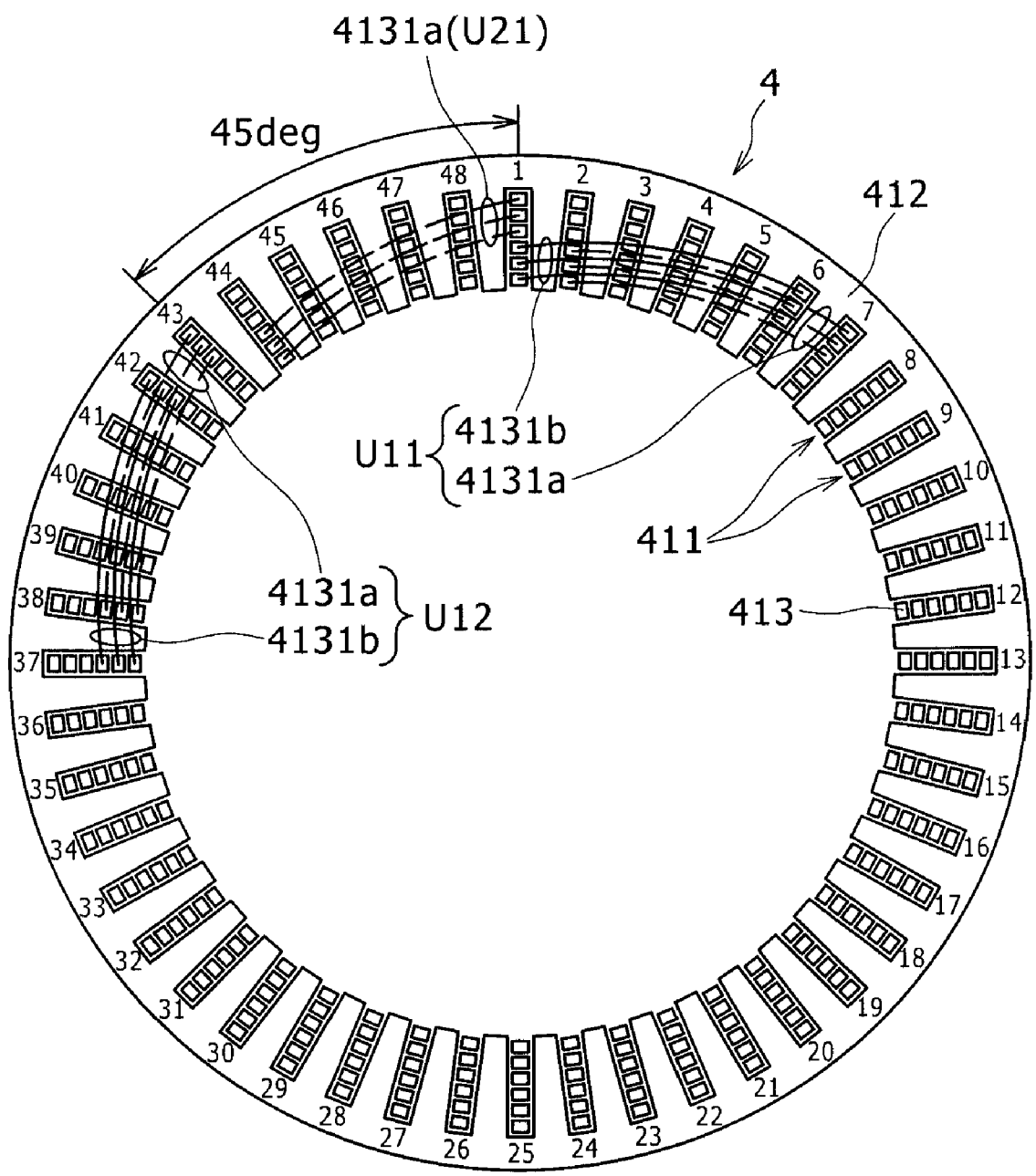
FIG. 2 is a sectional view showing a stator of the induction-type rotating electric apparatus.
Figure 3:
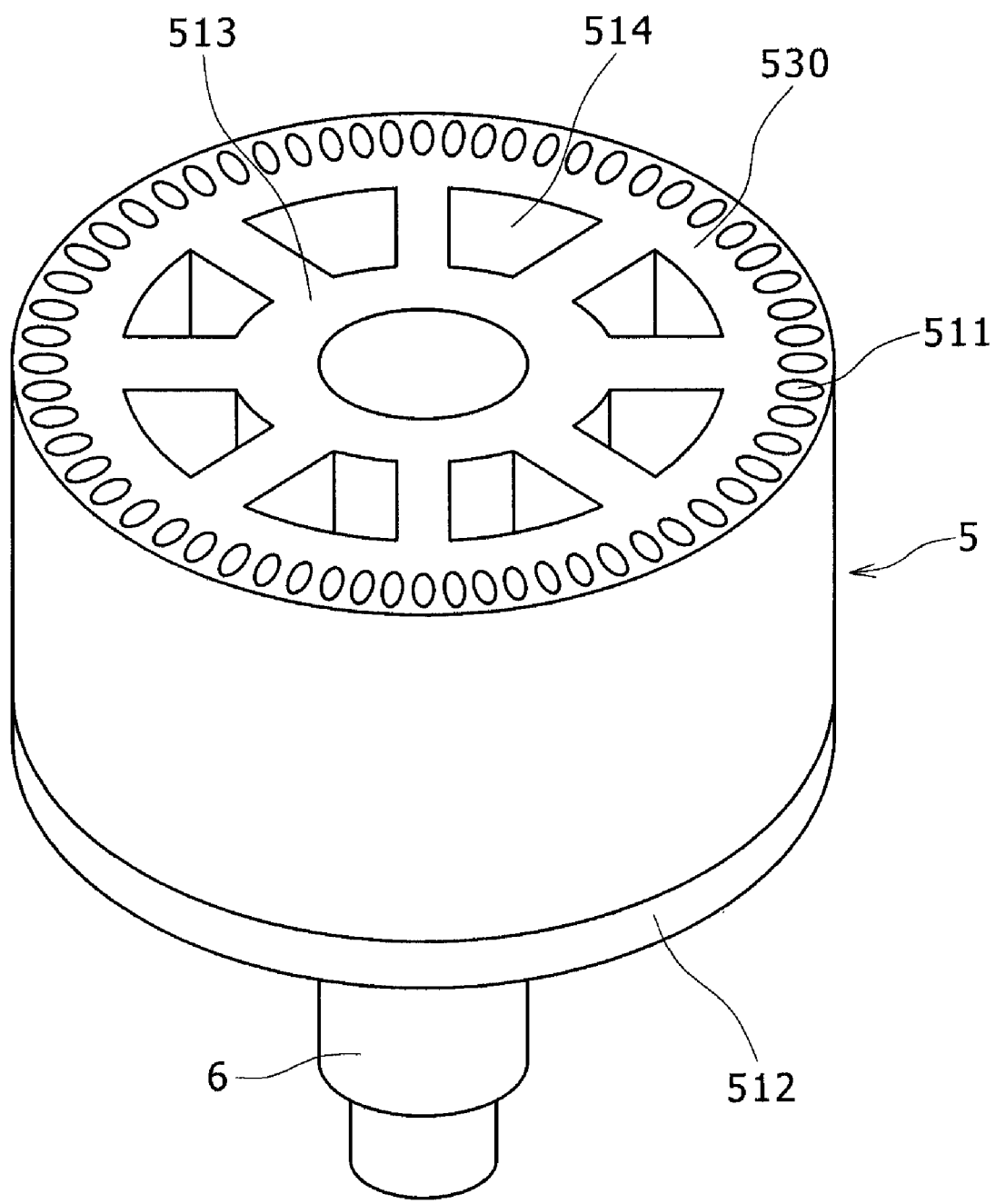
FIG. 3 is a perspective view showing a cross section of a rotor of the induction-type rotating electric apparatus.

FIG. 1 is a sectional side view showing an induction-type rotating electric apparatus in a preferred embodiment of the present invention, FIG. 2 is a sectional view showing a stator of the induction-type rotating electric apparatus, and FIG. 3 is a perspective view showing a cross section of a rotor of the induction-type rotating electric apparatus. The induction-type rotating electric apparatus is provided with a housing 1 having an opening on one axial end side and a bottom on the other axial end side, and a cover 2 for sealing the opening of the housing 1. The housing 1 and the cover 2 are jointed by a plurality of bolts 3, e.g., six bolts 3. On the inside of the housing 1, there is provided a water channel formation member 22, and a stator 4 is secured to the inside of the water channel formation member 22 by means of shrinkage-fitting or the like. A flange shown on the left-hand side of the water channel formation member 22 is secured between the housing 1 and the cover 2, and a water channel is formed between the water channel formation member 22 and the housing 1. Cooling water for cooling the rotating electric apparatus is fed into the water channel 24 through an inlet 32, and after cooling the rotating electric apparatus, the cooling water is fed out of an outlet 34.

The stator 4 comprises a stator iron core 412 having a plurality of slots 411 formed circumferentially at equally spaced intervals, and a three-phase stator coil 413 having a winding-around form thereof in each of the plurality of slots 411. In the induction-type rotating electric apparatus according to the present preferred embodiment, a star connection (Y connection) is formed on the stator coil 413 having an eight-pole structure, and for each phase, there is provided an arrangement of 2Y connection in which a formation of parallel connection is made on a pair of winding parts. On the stator iron core 412 in which the stator coil 413 is contained in a winding-around form, the plurality of slots 411, e.g., a total of 48 slots 411 are provided. In the fabrication of the stator iron core 412, a magnetic steel sheet having a thickness of 0.05 to 0.35 mm, for example, is formed by punching or etching, and then a plurality of magnetic steel sheets thus formed are laminated on one another to provide a laminated structure in which the plurality of slots 411 are disposed circumferentially at equally spaced intervals in a radial formation.

On the inner circumferential side of the stator iron core 412, a rotor 5 is rotatably disposed in a fashion that the rotor 5 faces the stator iron core 412 via a minuscule air gap. The rotor 5 is secured to a shaft 6 so that the rotor 5 rotates integrally with the shaft 6. The shaft 6 is rotatably supported by a pair of ball bearings 7a and 7b that are mounted on the cover 2 and housing 1 respectively. On the cover 2, the ball bearing 7a is secured to the cover 2 with a retaining plate (not shown), and on the bottom side of the housing 1, the ball bearing 7b is secured to a recessed part formed on the bottom of the housing 1.

On the left-hand side of the shaft 6, a pulley 12 is mounted with a nut 11. Between the pulley 12 mounted on the shaft 6 and the bearing 7a, there are provided a sleeve 9 and a spacer 10. The outer circumference of the sleeve 9 and the inner circumference of the pulley 12 are formed in a substantially conical shape, and the pulley 12 and the shaft 6 are rigidly integrated with a clamping force of the nut 11 so that the pulley 12 and the shaft 6 can be integrally rotated. When the rotor 5 is driven for rotation thereof with respect to the stator 4, a turning force of the shaft 6 is output externally via the pulley 12. In cases where the rotating electric apparatus serves as a generator, a turning force is input to the shaft 6 via the pulley 12.

As shown in FIG. 3, the rotor 5 of a squirrel cage type has a rotor iron core 513, in which a plurality of conductor bars 511 extending in the axial direction of rotation are embedded circumferentially at equally spaced intervals on the outer circumferential side thereof. The rotor iron core 513 is made of magnetic material, and a short-circuit ring 512 for short-circuiting each conductor bar 511 is provided on both the axial ends of the rotor iron core 513. To clarify the relationship between the rotor iron core 513 and the conductor bar 511 in the perspective view of FIG. 3, a sectional structure taken along a plane perpendicular to the axis of rotation is shown without illustration of the short-circuit ring 512 and the shaft 6 on the pulley 12 side.

In the fabrication of the rotor iron core 513, a magnetic steel sheet having a thickness of 0.05 to 0.35 mm, for example, is formed by punching or etching, and then a plurality of magnetic steel sheets thus formed are laminated on one another to provide a laminate structure. As shown in FIG. 3, on the inner circumferential side of the rotor iron core 513, a plurality of cavities each having a substantially fan shape are formed circumferentially at equally spaced intervals for the purpose of reduction in weight. On the outer circumferential side of the rotor iron core 513, i.e., on the stator-facing side of the rotor iron core 513, the plurality of conductor bars 511 are embedded, and a magnetic circuit is produced on a rotor yoke 530 located on the inner side with respect to each conductor bar 511. Each conductor bar 511 and each short-circuit ring 512, which are made of aluminum, are integrated with the rotor iron core 513 by die-casting. The short-circuit ring 512 located at each of both ends of the rotor iron core 513 is so arranged that the short-circuit ring 512 protrudes endwise in the axial direction with respect to the rotor iron core 513. Although not shown in FIG. 1, a detection rotor for detecting rotations of the rotor 5 is provided on the bottom of the housing 1. A rotation sensor 13 detects the number of teeth per unit time of the detection rotor being rotated, and outputs electrical signals for detecting a positioning of the rotor 5 and a rotating speed of the rotor 5.

Figure 4:
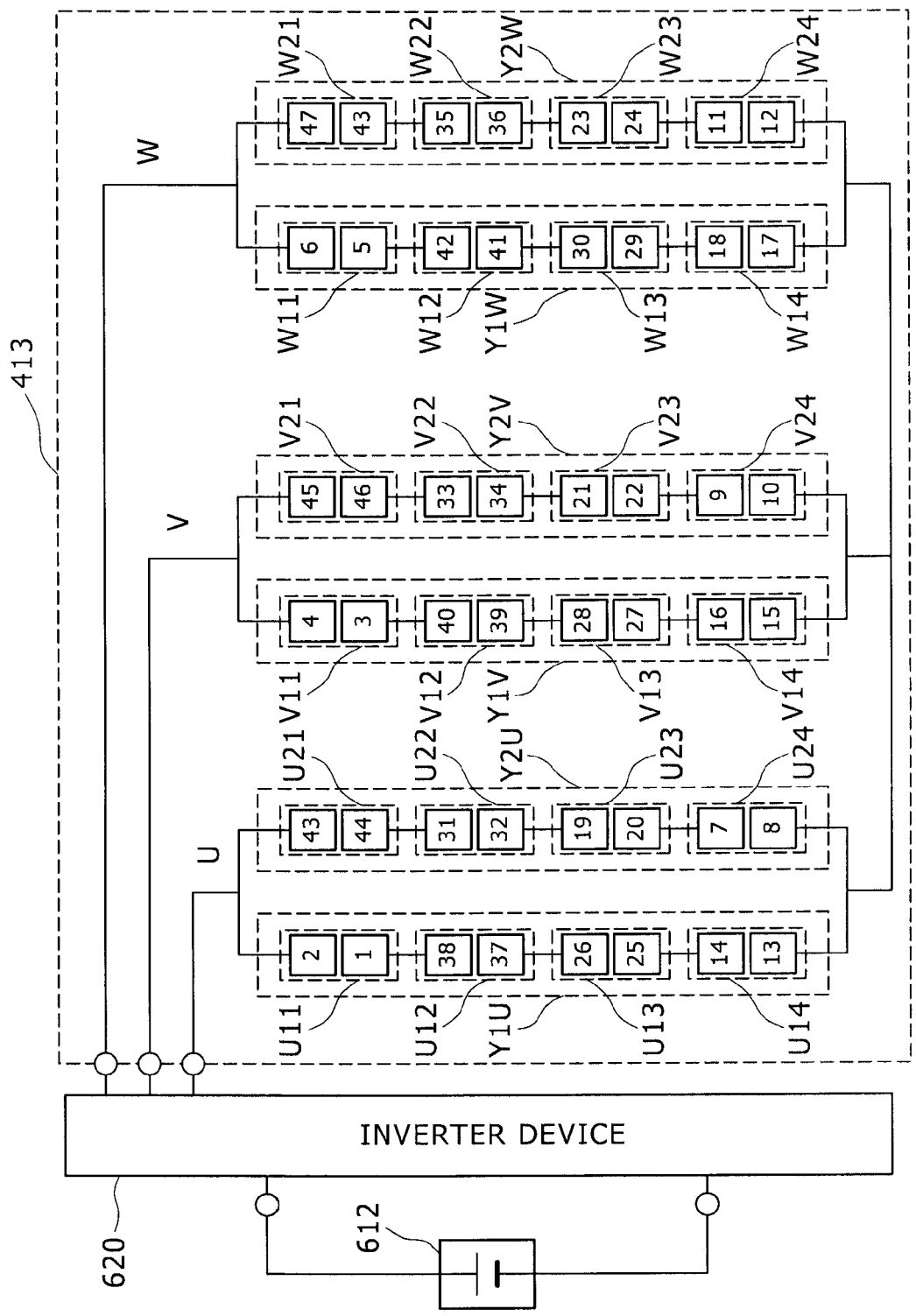
FIG. 4 is a connection diagram of a stator coil 413 formed in 2Y connection.

Referring to FIG. 4, there is shown a connection diagram of the stator coil 413 formed in 2Y connection. DC terminals of a secondary battery 612 for driving and an inverter device 620 are electrically connected with each other. The secondary battery 612 supplies the inverter device 620 with DC power, and then the inverter device 620 feeds AC power to the three-phase stator coil 413 having a winding-around form thereof in each of the plurality of slots 411 of the stator iron core 412. Thus, the stator coil 413 produces a rotating magnetic field in accordance with a rotating speed corresponding to AC power frequency.

According to the present preferred embodiment, the stator coil 413 is provided with two star connection lines Y1 and Y2. The Y1 connection line comprises a U-phase winding Y1U, V-phase winding Y1V, and W-phase winding Y1W; and the Y2 connection line comprises a U-phase winding Y2U, V-phase winding Y2V, and W-phase winding Y2W. The Y1 connection line and the Y2 connection are connected in parallel, with each neutral point thereof connected. The winding Y1U comprises coils U11, U12, U13, and U14 that are connected in series, and the winding Y2U comprises coils U21, U22, U23, and U24 that are connected in series. Likewise, the winding Y1V comprises coils V11, V12, V13, and V14 that are connected in series, and the winding Y2V comprises coils V21, V22, V23, and V14 that are connected in series, the winding Y1W comprises coils W11, W12, W13, and W14 that are connected in series, and the winding Y2W comprises coils W21, W22, W23, and W24 that are connected in series.

In the present preferred embodiment, a lap winding type of distributed winding arrangement is adopted for the purpose of reduction in coil end size, and each of the coils U11 to W24 comprises a pair of continuous coils 4131a and 4131b as shown in FIG. 5(a). The coils 4131a and 4131b, each having the same number of wire turns (e.g., three wire turns), are arranged to be continuous via an interconnecting conductor 4134. Although an alpha winding pattern is used for the coils 4131a and 4131b, there may be provided a normal winding pattern therefor. In the rotating electric apparatus according to the present preferred embodiment, a total of 24 pairs of coils 4131a and 4131b are used, and each of the coils 4131a and 4131b is fitted into a corresponding slot 411 thereof in the stator iron core 412.

In FIG. 4, the two coils 4131a and 4131b constituting the coil U11 are indicated by reference numerals 2 and 1, respectively. In FIG. 2, a winding-around form of the two coils 4131a and 4131b constituting the coil U11, and a winding-around form of the two coils 4131a and 4131b constituting the coil U12 are schematically indicated by the broken line (4131a) and the solid line (4131b). For each pair of coils 4131a and 4131b, a winding-around form is provided between a pair of slots 411 in a fashion that four slots are interleaved therebetween.

For example, in the case of the coil 4131b included in the coil U11, a winding-around form is provided between No. 1 slot 411 and No. 6 slot 411. In No. 1 slot, the rotor-side slot position (top-side slot position) is used, and in No. 6 slot, the bottom-side slot position is used. On the other hand, for the coil 4231a included in the coil U11, a winding-around form is provided between the top-side slot position of No. 2 slot and the bottom-side slot position of No. 7 slot. In the same manner, for the coil 4131a included in the coil U12, a winding-around form is provided between No. 38 slot 411 and No. 43 slot 411. For the coil 4131b included in the coil U12, a winding-around form is provided between No. 37 slot 411 and No. 42 slot 411. It is to be noted that the number of slots interleaved between a pair of slots for winding-around coil formation such as in the manner mentioned above depends on the total number of slots and the number of phases, i.e., the number of interleaved slots is not necessarily four.

In FIG. 4 where the coil 4131a included in the coil 11 is indicated by reference numeral 2 and the coil 4131b included therein is indicated by reference numeral 1, the reference numerals 1 and 2 correspond to slot numbers assigned to the top-side slot positions of the slots 411 in which the coils 4131a and 4131b are disposed. In a total of 48 slots 411, "No. 1" is assigned to an arbitrary slot 411, and subsequent serial numbers are assigned to the remaining slots in the order of circumferential direction. The coil 4131a has a winding-around form between No. 2 slot 411 and No. 7 slot 411; in No. 2 slot 411, the rotor-side slot position (top-side slot position) is used for insertion, and in No. 7 slot 411, the bottom-side slot position is used for insertion.

As mentioned above, the numbers assigned to a pair of coils in FIG. 4 represent slot numbers corresponding to insertion of each coil on the rotor side. Since the coils 4131a and 4131b in a pair are inserted in adjacent slots 411, it is possible to reduce torque pulsation.

Referring to FIG. 6, there is shown a positional relationship of slots 411 and coil parts constituting the stator coil 413. In field 442 shown in FIG. 6, the slot numbers 1 to 48 assigned as mentioned above are indicated. For example, the two coils 4131a and 4131b constituting the coil U11 (i.e., No. 2 and No. 1 coils shown in FIG. 4) are inserted to the rotor-side slot positions of No. 2 and No. 1 slots. To clarify this arrangement, reference code U11 is indicated below slot numbers 2 and 1 in the field 442. For example, in the field 442, the coil W13 is indicated by slot numbers 29 and 30. That is to say, there is shown a structural arrangement in which the coil W13 is formed with a series connection of the coil 4131a disposed at the rotor-side slot position of No. 29 slot 411 and the coil 4131b disposed at the rotor-side slot position of No. 30 slot 411.

In field 444 shown in FIG. 6, there are indicated stator winding phases and allocations thereof. As mentioned above, the coils 4131a and 4131b constituting the coil U11 are inserted to the rotor-side slot positions of No. 2 and No. 1 slots 411. In the field 444, the coils 4131a and 4131b constituting the coil U11 are both indicated as [U1]. This means that a first position of U phase, i.e., a reference position of U phase of the stator winding is used therefor. The coils 4131a and 4131b constituting the coil U21 are inserted to the rotor-side slot positions of No. 44 and No. 43 slots 411 as shown in the field 442, and the coils 4131a and 4131b constituting the coil U21 are both indicated as [U2] in the field 444. This means that the coil U21 is located at a second position of U phase of the stator winding, i.e., the coil U21 is located at a mechanical angle position of 45° with respect to the reference position of U phase. In the same manner, the coils 4131a and 4131b constituting the coil U12 are inserted to the rotor-side slot positions of No. 38 and No. 37 slots 411 as shown in the field 442, and the coils 4131a and 4131b constituting the coil U12 are both indicated as [U3] in the field 444. This means that the coil U12 is located at a third position of U phase of the stator winding, i.e., the coil U12 is located at a mechanical angle position of 90° with respect to the reference position of U phase.

More specifically, in the winding Y1U shown in FIG. 4, the coil U11 is located at the reference position of U phase, and the coils U12, U13, and U14 are located at a third position (a mechanical angle position of 90°), a fifth position (a mechanical angle position of 180°), and a seventh position (a mechanical angle position of 270°), respectively, with respect to the reference position of U phase. On the other hand, the coils U21, U22, U23, and U24 of the winding Y2U are located at a second position (a mechanical angle position of 45°), a fourth position (a mechanical angle position of 135°), a sixth position (a mechanical angle position of 225°), and an eighth position (a mechanical angle position of 315°), respectively, with respect to the reference position of U phase as shown in the field.

The coil V11 of the winding Y1V is shifted by two slot positions with respect to the coil U11, i.e., the coil V11 is shifted through a mechanical angle of 15° with respect to the coil U11. The position of the coil V11 is used as a reference position of V phase, which is indicated as [V1] in the field 444. The coils V12, V13, and V14 of the winding Y1V, which are connected in series with the coil V11 of the winding Y1V, are indicated as [V3], [V5], and [V7], respectively, in the field 444, i.e., the coils V12, V13, and V14 of the winding Y1V are located at a third position (a mechanical angle position of 90°), a fifth position (a mechanical angle position of 180°), and a seventh position (a mechanical angle position of 270°), respectively, with respect to the reference position of V phase. On the other hand, the coil V21 of the winding Y2V, which is indicated as [V2] in the field 444, is located at a position shifted through a mechanical angle of 45° with respect to the coil V11. The coils V22, V23, and V24 of the winding Y2V, which are indicated as [V4], [V6], and [V8] in the field 444, are located at a fourth position (a mechanical angle position of 135°), a sixth position (a mechanical angle position of 225°), and an eighth position (a mechanical angle position of 315°), respectively, with respect to the reference position of V phase. Since the coil V11 of V phase is shifted through a mechanical angle of 15° with respect to the coil U11 as mentioned above, each coil of V phase is shifted through a mechanical angle of 15° with respect to each corresponding coil of U phase. Similarly, since the coil W11 of W phase is shifted through a mechanical angle of 30° with respect to the coil U11, each coil of W phase is shifted through a mechanical angle of 30° with respect to each corresponding coil of U phase.

The following describes field 446 shown in FIG. 6. According to the present preferred embodiment, respective coils 4131a and 4131b in pairs are disposed in a winding-around form through respective slots in pairs. More specifically, as mentioned above, the coil 4131a of the coil U11 has a winding-around form between No. 2 slot 411 and No. 7 slot 411 in a fashion that winding in No. 2 slot 411 is disposed at the rotor-side slot position thereof, and winding in No. 7 slot is disposed at the bottom-side slot position thereof. In the field 446, bottom-side slot position numbers are indicated. For example, the coil 4131b of the coil U11 is disposed in a winding-around form between No. 1 slot 411 and No. 6 slot 411 in a fashion that winding in No. 1 slot 411 is disposed at the rotor-side slot position thereof, and winding in No. 6 slot 411 is disposed at the bottom-side slot position thereof.

In field 448 shown in FIG. 6, there are indicated phases of coils disposed at bottom-side slot positions of slots 411 represented by numbers in the field 442, and coil allocations of respective phases. In field 450 shown in FIG. 6, there are indicated slot numbers corresponding to allocations of coils in a winding-around form indicated in the field 448. For example, as shown in the field 442, the coil 4131a of the coil U11 is inserted at the rotor-side slot position of No. 2 slot 411. On the other hand, at the bottom-side slot position of No. 2 slot 411, the coil 4131b of the coil V21 is inserted which corresponds to insertion thereof at the rotor-side slot position of No. 45 slot 411. Accordingly, "No. 45" is indicated in the field 450. In the field 448, [V2] is indicated which represents that the coil 4131b of the coil V21 is a second coil of phase V.

Referring to FIG. 7, there is shown a perspective view of the stator iron core 412 having a total of 24 coils (coils U11 to W24) mounted in slots thereof in a state before the coils are connected mutually. Each of the coils U11 to W24 comprises two coils 4131a and 4131b that are connected via the interconnecting conductor 4134 in an alpha winding pattern of a tandem connection type as shown in FIG. 5(a). In lap winding, respective conductor terminals 211 and 212 of the coils U11 to W24 are concentrated on one axial side of the stator iron core 412, i.e., a total of 48 conductor terminals 211 and 212 are led out from a coil end 220 in the upward direction as shown in FIG. 7. The conductor terminals 211 and 212 of each of the coils U11 to W24 are connected to the conductor terminals 211 and 212 of an adjacent coil to be connected in series as shown in FIG. 4.

Each of the coils U11 to W24 comprises a pair of coils 4131a and 4131b, and the conductor terminal 211 of each coil 4131a is led out from the bottom-side slot position of each slot 411, whereas the conductor terminal 212 of each coil 4131b is led out from the rotor-side slot position of each slot 411. In the case of the coil U11 for example, as shown in FIG. 4, the coil 4131a is provided in a winding-around form between a pair of slots 411 indicated as No. 2 slot (rotor-side slot position) and No. 7 slot (bottom-side slot position), and the beginning of coil winding corresponding to a leading-out point of the conductor terminal 211 is positioned on the No. 7 slot side (refer to FIG. 5(a)). On the other hand, the coil 4131b of the coil U11 is provided in a winding-around form between a pair of slots 411 indicated as No. 1 slot (rotor-side slot position) and No. 6 slot (bottom-side slot position), and the end of coil winding corresponding to a leading-out point of the conductor terminal 212 is positioned on the No. 1 slot side.

For connection between the coil U11 and coil U12, the conductor terminal 212 of the coil 4131b constituting the coil U11 is connected to the conductor terminal 211 of the coil 4131a constituting the coil U12 as shown in FIG. 5(b). In this case, the conductor terminal 212 led out at the rotor-side slot position (top-side slot position) is to be connected to the conductor terminal 211 led out at the bottom-side slot position across an upper part of the coil end 220, while it is required to minimize the height of the coil end 220 for reduction in size of the rotating electric apparatus. The following describes connection structures designed for height reduction of the coil end 220 as regards connection between the conductor terminal 212 on the inner circumferential side of the coil end 220 and the conductor terminal 211 on the outer circumferential side of the coil end 220.

A First Connection Structure:

Referring to FIGS. 8(a)-8(d), there is shown a first connection structure of the conductor terminals 211 and 212 according to a preferred embodiment of the present invention.

Between the coils U11 and U12 shown in FIG. 5(a), a mechanical angle shift of 90° is provided as can be seen from FIG. 2. However, as shown in FIG. 5, for connection between the coils U11 and U12, the conductor terminal 212 of the coil 4131b of the coil U11 is connected to the conductor terminal 211 of the coil 4131a of the coil U12. As shown in FIG. 2, the conductor terminal 212 of the coil 4131b of the coil U11 is disposed at the top-side slot position of No. 1 slot 411, and the conductor terminal 211 of the coil 4131a of the coil U12 is disposed at the bottom-side slot position of No. 43 slot 411. Accordingly, there is provided a mechanical angle shift of 45° between the conductor terminal 211 of the coil U11 and the conductor terminal 211 of the coil U12 to be connected with each other.

As shown in FIG. 8(a), the conductor terminal 211 on the outer circumferential side of the coil end 220 is curved spiralwise along the coil end 220 toward the conductor terminal 212 on the inner circumferential side of the coil end 220 so that a joint part 211a of the conductor terminal 211 is radially opposed to the conductor terminal 212. The expression "curved spiral-wise" used herein represents a state of conductor wire formation in which the conductor terminal 211 is laid spiral-wise inward to a slight extent along the coil end 220. It is to be noted that, for this spiral-wise curving formation, the conductor terminal 211 on the outer circumferential side is arranged to have a terminal length longer than that of the conductor terminal 212 on the inner circumferential side. In FIGS. 8(a)-8(d), the coil end 220 is shown in a cylindrical form for the sake of convenience in illustration.

Then, as shown in FIG. 8(b), the conductor terminal 212 on the inner circumferential side is curved radially along the coil end 220 so as to bring a joint part 212a of the conductor terminal 212 close to the joint part 211a of the conductor terminal 211. To prevent possible damage to a surface of the coil end 220 due to thermal effect at the time of joint connection, the joint parts 211a and 212a are disposed at a certain distance position from the coil end 220. In the case of the conductor terminals 211 and 212 shaped as shown in FIG. 8(b), the conductor terminals 211 and 212 can be segmented into two kinds of parts; joint parts 211a and 212a, and curved parts 211b and 212b. Thereafter, the joint parts 211a and 212a are connected mutually by means of TIG welding or the like. As a technique for this connection and the other connections to be described below, fusing, fusing-brazing, or resistance-brazing may be used instead of TIG welding.

After completion of connection between the conductor terminals 211 and 212, the joint parts 211a and 212a are bent radially toward the outer circumferential side of the coil end 220 as shown in FIG. 8(c). In this manner, the conductor terminal 212 is curved radially outwardly from the inner circumferential side of the coil end 220, and further the joint parts 211a and 212a are bent radially toward the outer circumferential side of the coil end 220. Thus, there is provided a total coil end height consisting of the height of the coil end 220 itself before joint connection and the width of one conductor terminal 212, making it possible to realize reduction in coil end height. In cases where a conductor having a rectangular cross section (flat-type conductor) is used as a coil wire material, the joint parts 211a and 212a are connected mutually so that the long sides of the rectangular cross sections of the joint parts 211a and 212a are made to face each other. In this manner, the connection between the joint parts 211a and 212a can be secured, and also an increase in coil end height at the time of joint connection can be limited to a dimension of the short side of the rectangular cross section of the conductor. Needless to say, as shown in FIG. 8(d), the short sides of the rectangular cross sections of the joint parts 211a and 212a may be arranged to face each other circumferentially for connection thereof.

Since there is a vacant space on the core back side of the coil end 220, the joint parts 211a and 212a may be bent further toward the core back side as indicated by the broken line in FIG. 8(c). By bending the joint parts 211a and 212a in the arrow direction AL to provide the form indicated by the broken line, it is possible to reduce the outer circumferential dimension of the coil end structure including the joint parts 211a and 212a. In particular, where the core back diametric dimension of the stator iron core 412 is relatively small, the above arrangement is advantageous to prevent the joint parts 211a and 212a from protruding sidewardly from the outer circumferential face of the stator iron core 412.

Furthermore, in cases where there is a vacant space available for bending the joint parts 211a and 212a on the inner circumferential side of the coil end 220, the joint parts 211a and 212a may be bent toward the inner circumferential side of the coil end 220. Further, instead of the conductor terminal 211 on the outer circumferential side, the conductor terminal 212 on the inner circumferential side may be curved spiral-wise toward the conductor terminal 211, or both the conductor terminals 211 and 212 may be curved spiral-wise so as to bring the conductor terminals 211 and 212 close to each other.

Figure 9A:
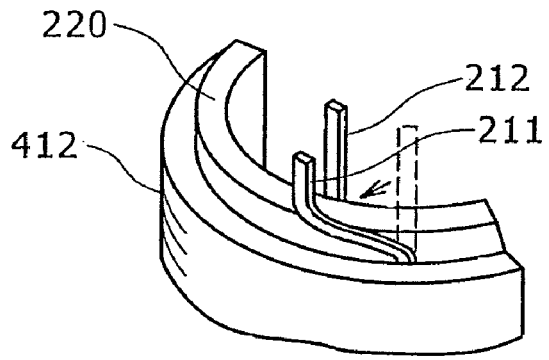
FIGS. 9(a)-9(d) are explanatory diagrams of a second connection structure of the conductor terminals 211 and 212.
Figure 9B:
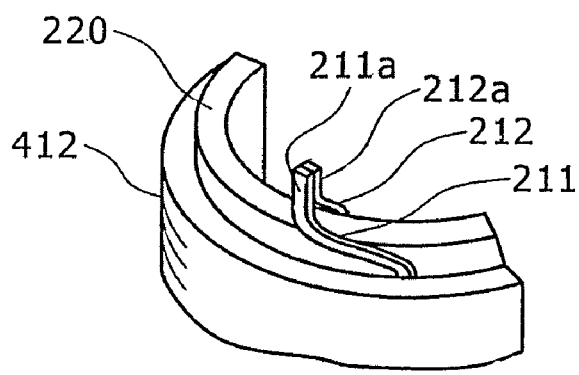

A Second Connection Structure:

Referring to FIGS. 9(a)-9(d), there are shown explanatory diagrams of a second connection structure of the conductor terminals 211 and 212 according to another preferred embodiment of the present invention. As in the first connection structure mentioned above, the conductor terminal 211 on the outer circumferential side of the coil end 220 is curved spiral-wise along the coil end 220 so that the joint part 211a thereof is opposed to the conductor terminal 212 on the inner circumferential side of the coil end 220 as shown in FIG. 9(a). Then, as shown in FIG. 9(b), the conductor terminal 212 on the inner circumferential side is curved radially along the coil end 220 so as to bring the joint part 212a of the conductor terminal 212 close to the joint part 211a of the conductor terminal 211. Thereafter, the joint parts 211a and 212a are connected mutually by means of TIG welding or the like. The procedural steps up to here are similar to those in the first connection structure described above.

Figure 9C:
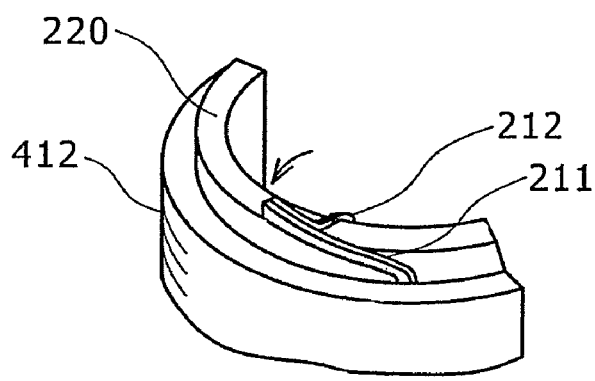
Figure 9D:
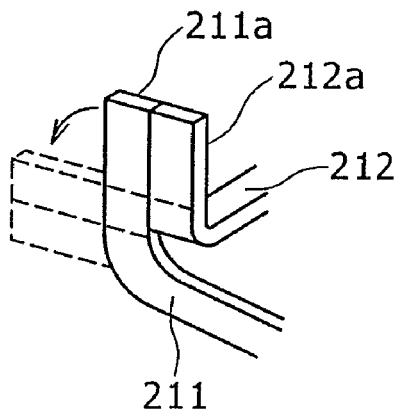

Then, as shown in FIG. 9(c), the joint parts 211a and 212a are bent circumferentially onto the upper end face or outer circumference of the coil end 220. In this connection structure, there is provided a total coil end height consisting of the height of the coil end 220 itself before joint connection and the substantial width of one conductor terminal 212, making it possible to realize reduction in coil end height. While the joint parts 211a and 212a of the conductor terminals of a flat type are connected mutually so that the long sides of the rectangular cross sections of the joint parts 211a and 212a are made to face each other radially in the example shown in FIG. 9(b), the joint parts 211a and 212a may be connected mutually so that the short sides of the rectangular cross sections of the joint parts 211a and 212a are made to face each other circumferentially as shown in FIG. 9(d).

In the second connection structure, since the joint parts 211a and 212a are bent circumferentially, the joint parts 211a and 212a can be contained in a vacant space at an upper position of the core back outside the coil end 220 even if the joint parts 211a and 212a are long to a certain extent. Therefore, by disposing the joint parts 211a and 212a in FIG. 9(b) at a height position with sufficient allowance from the coil end 220, it is possible to reliably prevent possible damage to a surface of the coil end 220 due to thermal effect at the time of joint connection. As in the case of the first connection structure, the conductor terminal 212 on the inner circumferential side may be curved spiral-wise instead of the conductor terminal 211 on the outer circumferential side.

Figure 10A:
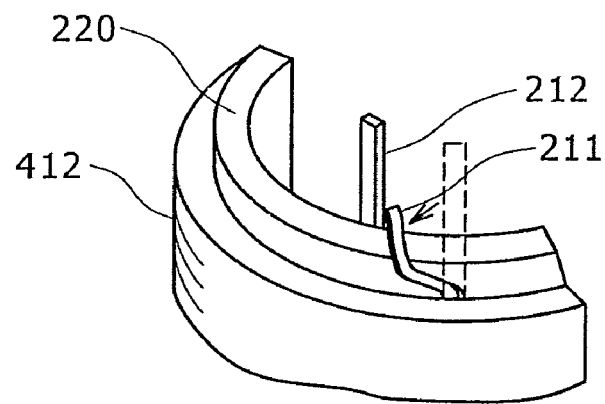
FIGS. 10(a)-10(c) are explanatory diagrams showing a third connection structure of the conductor terminals 211 and 212.
Figure 10B:
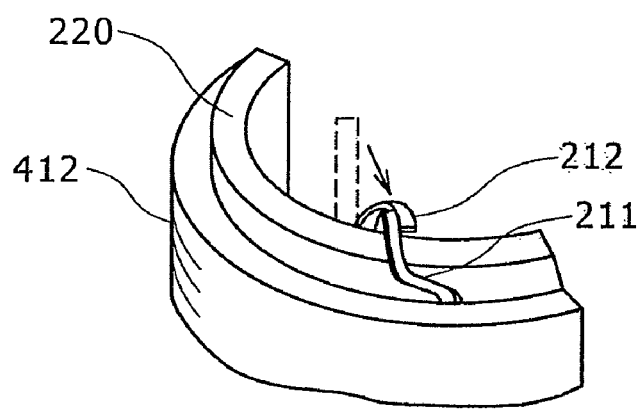
Figure 10C:
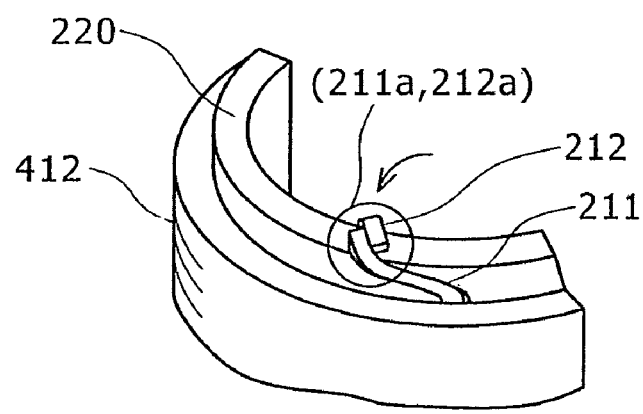

A Third Connection Structure:

Referring to FIGS. 10(a)-10(c), there are shown explanatory diagrams of a third connection structure of the conductor terminals 211 and 212 according to another preferred embodiment of the present invention. While either one of the conductor terminals 211 and 212 is curved spiral-wise in the first and second connection structures, both the conductor terminals 211 and 212 are curved spiral-wise in the third connection structure.

First, as shown in FIG. 10(a), the conductor terminal 211 on the outer circumferential side of the coil end 220 is curved spiral-wise along the coil end 220 toward the conductor terminal 212, and the conductor terminal 211 is curved radially inwardly to a small extent in the vicinity of the midpoint between a leading-out position of the conductor terminal 211 and a leading-out position of the conductor terminal 212. The conductor terminal 211 is thus curved to provide a form different from that shown in FIG. 8(a). Next, as shown in FIG. 10(b), the conductor terminal 212 on the inner circumferential side of the coil end 220 is curved spiral-wise along the coil end 220 toward the conductor terminal 211. Then, at a point between the leading-out position of the conductor terminal 211 and the leading-out position of the conductor terminal 212, e.g., in the vicinity of the midpoint therebetween, the conductor terminal 212 is curved outwardly to a slight extent so that the left-hand side face of the joint part 212a of the conductor terminal 212 abuts with the right-hand side face of the joint part 211a of the conductor terminal 211. Thereafter, the joint parts 211a and 212a are connected mutually by means of TIG welding or the like. In this step, it is preferable that the side faces of the joint parts 211a and 212a be made to abut with each other at a certain distance position from the coil end 220 to prevent possible damage to a surface of the coil end 220 due to thermal effect at the time of joint connection.

Then, as shown in FIG. 10(c), the joint parts 211a and 212a are brought downwardly into close contact with the coil end 220. Thus, there is provided a total coil end height consisting of the height of the coil end 220 itself before joint connection and the width of one conductor terminal 212, making it possible to realize reduction in coil end height. In cases where a flat-type conductor having a rectangular cross section is used as a coil wire material, the joint parts 211a and 212a are connected mutually so that the short sides of the rectangular cross sections of the joint parts 211a and 212a are made to face each other. In this manner, an increase in coil end height at the time of connection of the joint parts 211a and 212a can be limited to a dimension of the short side of the rectangular cross section of the conductor.

Figure 11A:
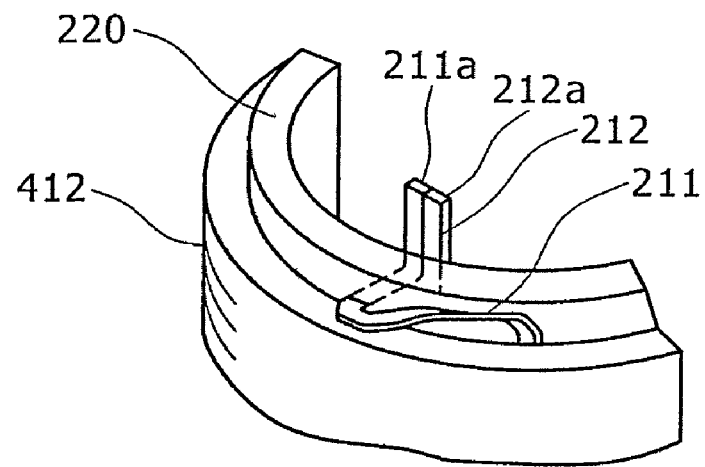
FIGS. 11(a)-11(b) are explanatory diagrams showing a fourth connection structure of the conductor terminals 211 and 212.
Figure 11B:
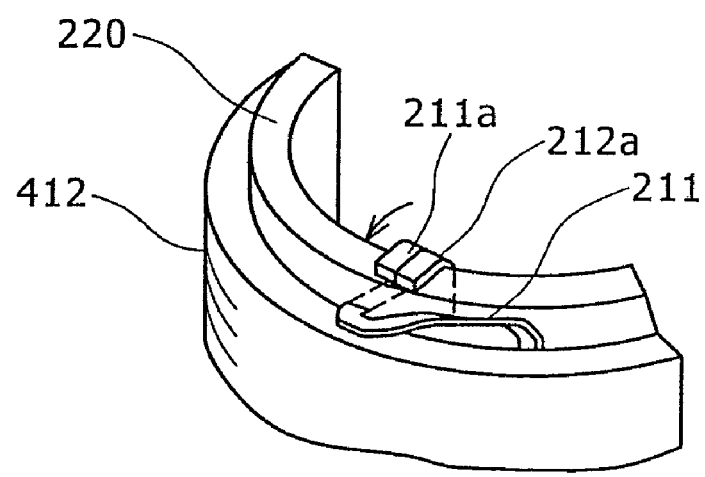

A Fourth Connection Structure:

Referring to FIGS. 11(a)-11(b), there is shown explanatory diagrams of a fourth connection structure of the conductor terminals 211 and 212 according to another preferred embodiment of the present invention. While the conductor terminals 211 and 212 are laid spiral-wise across the coil end 220 for connecting the joint parts 211a and 212a in the first to third connection structures mentioned above, one of the conductor terminals 211 and 212 is arranged to penetrate the coil end 220 to extend to an opposite side for connection between the joint parts 211a and 212a in the fourth connection structure.

As shown in FIG. 11(a), the conductor terminal 211 on the outer circumferential side of the coil end 220 is curved spiral-wise along the outer circumference of the coil end 220 toward the conductor terminal 212. Next, the conductor terminal 211 is run radially through a coil-to-coil clearance on the coil end 220, e.g., the conductor terminal 211 is formed to provide penetration thereof radially along a tooth of the stator iron core 412 so that the conductor terminal 211 is led out to the inner circumferential side of the coil end 220. Then, the joint part 211a of the conductor terminal 211 thus led out to the inner circumferential side of the coil end 220 is connected to the joint part 212a of the conductor terminal 212. In this step, as shown in FIG. 11(a), the joint parts 211a and 212a are disposed at a certain distance position from the coil end 220 to prevent possible damage to a surface of the coil end 220 due to thermal effect at the time of joint connection.

Then, as shown in FIG. 11(b), the joint parts 211a and 212a are bent radially along the coil end 220. In cases where a flat-type conductor having a rectangular cross section is used as a coil wire material, the joint parts 211a and 212a are connected mutually so that the short sides of the rectangular cross sections of the joint parts 211a and 212a, i.e., the lateral sides of the joint parts 211a and 212a are made to face each other as shown in FIG. 11 (a). Thus, there is provided a total coil end height consisting of the height of the coil end 220 itself before joint connection and the short-side width of one conductor terminal. Instead of forming the conductor terminal 211 on the outer circumferential side to provide penetration thereof to the inner circumferential side, the conductor terminal 212 on the inner circumferential side may be formed to provide penetration thereof to the outer circumferential side. In this case, the joint parts 211a and 212a are bent toward the inner circumferential side.

Further, the joint parts 211a and 212a may be bent along the outer circumference of the coil end 220. Thus, a vacant space available on the upper side of the coil back can be used advantageously. In this case, either the short sides or the long sides of the rectangular cross sections of the joint parts 211a and 212a may also be made to face each other for connection thereof.

Figure 12A:
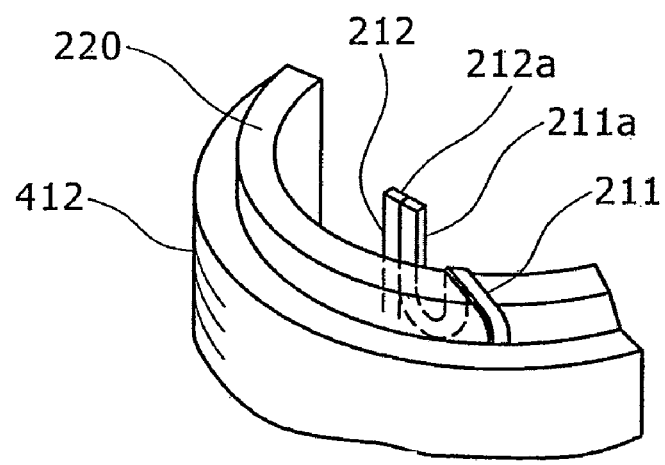
FIGS. 12(a)-12(b) are explanatory diagrams showing a fifth connection structure of the conductor terminals 211 and 212.
Figure 12B:
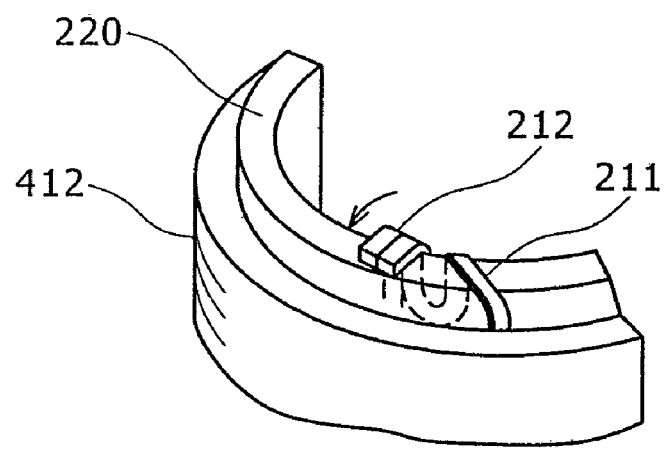

A Fifth Connection Structure:

Referring to FIGS. 12(a)-12(b), there are shown explanatory diagrams of a fifth connection structure of the conductor terminals 211 and 212 according to another preferred embodiment of the present invention. As shown in FIG. 12(a), the conductor terminal 211 on the outer circumferential side of the coil end 220 is curved spiral-wise along the coil end 220 so that the conductor terminal 211 is extended onto the inner circumferential side of the coil end 220. Then, on the inner circumferential side, the conductor terminal 211 is folded back through an angle of 180°, and the joint part 211a thereof is connected to the joint part 212a of the conductor terminal 212 on the inner circumferential side. In cases where a flat-type conductor having a rectangular cross section is used as a coil wire material, the joint parts 211a and 212a are disposed so that the short sides of the rectangular cross sections of the joint parts 211a and 212a are made to face each other. Thereafter, the joint parts 211a and 212a are connected mutually by means of TIG welding or the like. As in the case of the fourth connection structure, the joint parts 211a and 212a are disposed at a certain distance position from the coil end 220 to prevent possible damage to a surface of the coil end 220 due to thermal effect at the time of joint connection.

Then, as shown in FIG. 12(b), the joint parts 211a and 212a are bent radially outwardly along the coil end 220. In this fifth connection structure, there is also provided a total coil end height consisting of the height of the coil end 220 itself before joint connection and the short-side width of one conductor terminal, making it possible to realize reduction in coil end height. Further, there may also be provided such a modified arrangement that the conductor terminal 212 on the inner circumferential side of the coil end 220 is laid spiral-wise to extend onto the outer circumferential side of the coil end 220, the joint parts 211a and 212a are connected on the outer circumferential side, and then the joint parts 211a and 212a thus connected are bent toward the inner circumferential side.

Figure 13A:
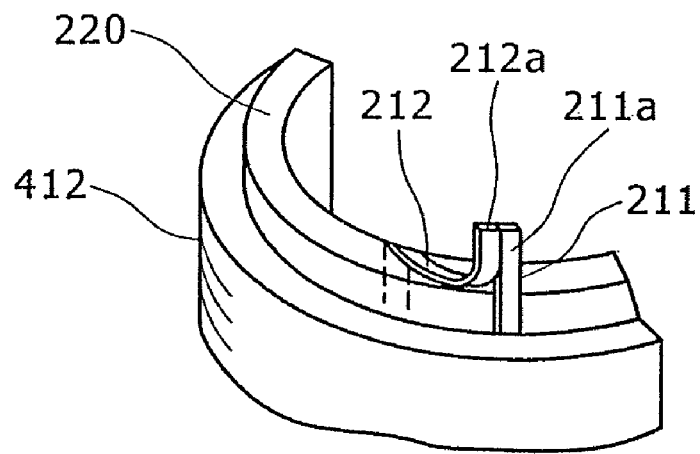
FIGS. 13(a)-13(b) are explanatory diagrams showing a sixth connection structure of the conductor terminals 211 and 212.
Figure 13B:
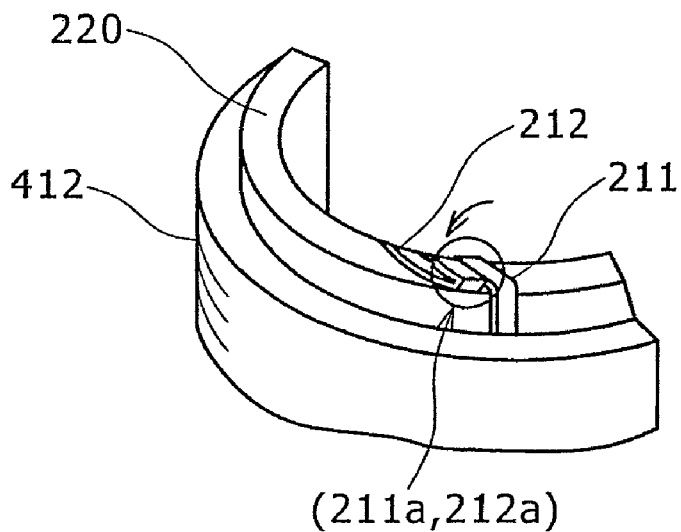

A Sixth Connection Structure:

Referring to FIGS. 13(a)-13(b), there are shown explanatory diagrams of a sixth connection structure of the conductor terminals 211 and 212 according to another preferred embodiment of the present invention. First, as shown in FIG. 13(a), the conductor terminal 212 on the inner circumferential side of the coil end 220 is curved spiral-wise along the coil end 220 in the radially outward direction toward the conductor terminal 211. Then, on the outer circumferential side, the joint parts 211a and 212a are connected so that the side faces thereof are made to abut with each other. In this step, the joint parts 211a and 212a are disposed at a certain distance position from the coil end 220 to prevent possible damage to a surface of the coil end 220 due to thermal effect at the time of joint connection.

Then, as shown in FIG. 13(b), the joint parts 211a and 212a are bent toward the inner circumferential side so that the joint parts 211a and 212a are brought downwardly into close contact with the coil end 220. In the sixth connection structure, since the joint part 212a of the conductor terminal 212 is folded back to the curved part of the conductor terminal 212, there is provided an increase in coil end height corresponding to a dimension of double the width of one conductor terminal. However, as compared with a conventional connection structure in which the joint parts 211a and 212a have a straight form, a total coil end height can be made lower in the sixth connection structure. Instead of the conductor terminal 212 on the inner circumferential side, the conductor terminal 211 on the outer circumferential side may be curved in the radially inward direction toward the conductor terminal 212, and then on the inner circumferential side, the joint parts 211a and 212a may be folded toward the outer circumferential side.

In the first to sixth connection structures described above, a total coil end height can be reduced substantially since the conductor terminals 211 and 212 are connected across the coil end 220, and then the joint parts thereof 211a and 212a are bent or folded at a vacant space position on the inner or outer circumferential side of the coil end 220 or along the coil end 220.

A Seventh Connection Structure:

In a situation where a flat-type conductor used as a coil wire material is relatively thick, it is rather difficult to curve or bend the conductor terminals 211 and 212 freely at a small radius of curvature in particular. For example, where the connection structure demonstrated in FIGS. 8(a)-8(d) are adopted, there occurs a difficulty in curving the conductor terminal 211 along the coil end 220 in a three-dimensional form to meet the conductor terminal 212. Further, when the conductor terminal 211 is bent so that the wide side faces of the conductor terminals 211 and 212 are opposed to each other, a large space is occupied by this bending formation, resulting in a total coil end height being increased on the contrary.

Figure 14A:
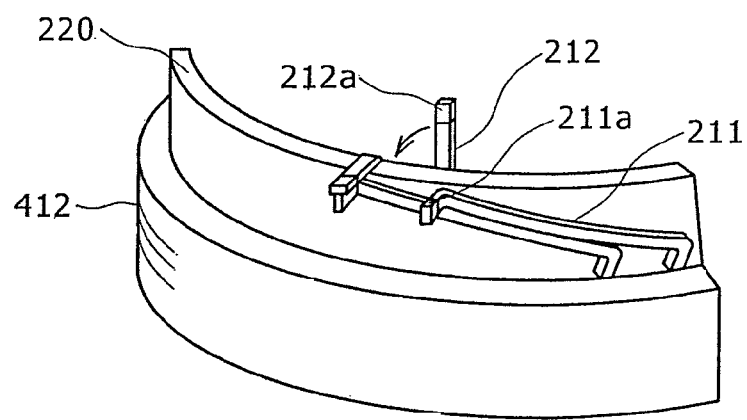
FIGS. 14(a)-14(b) are explanatory diagrams showing a seventh connection structure of the conductor terminals 211 and 212.

To eliminate the need for curving or bending the conductor terminal 211 complicatedly in a three-dimensional form, there is provided a seventh connection structure in which the wide side face of the conductor terminal 212 to be bent radially outwardly (the long side of the rectangular cross section thereof) is connected to the narrow side face of the conductor terminal 211 (the short side of the rectangular cross section thereof). First, as shown in FIG. 14(a), the conductor terminal 211 on the outer circumferential side of the coil end 220 is curved spiral-wise along the coil end 220 as far as possible so that the joint part 211a of the conductor terminal 211 is located at a position corresponding to the conductor terminal 212 on the inner circumferential side of the coil end 220. In this step, the joint part 211a of the conductor terminal 211 is disposed at a height level almost even with the upper end face of the coil end 220.

Figure 14B:
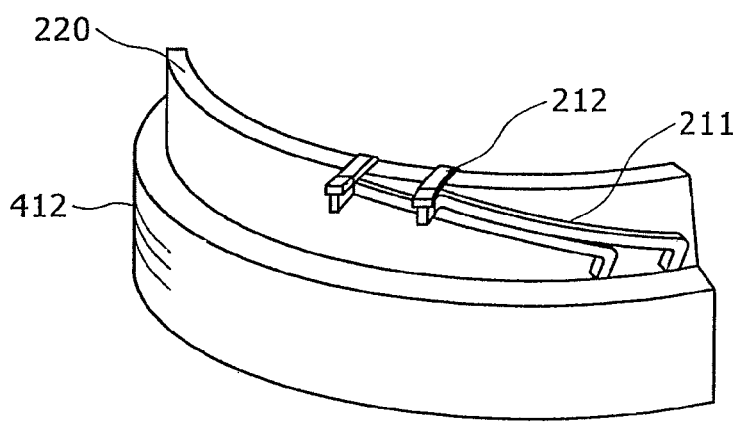

Then, the joint part 211a of the conductor terminal 211 that has been curved along the outer circumference of the coil end 220 is bent through a substantially right angle with respect to the outer circumference of the coil end 220, i.e., the joint part 211a is bent radially outwardly. In this step, the joint part 211a is so bent that the side faces thereof are positioned almost perpendicularly with respect to the outer circumference of the coil end 220. Then, as shown in FIG. 14(b), the conductor terminal 212 on the inner circumferential side is bent radially outwardly along the upper end face of the coil end 220 so that the joint part 212a thereof abuts with the joint part 211a. Thus, the wide side face of the joint part 212a is in contact with the narrow side face of the joint part 211a to provide a T shape in the cross-sectional configuration of the joint parts 212a and 211a. Thereafter, with the T shape held using a jig or the like, the joint parts 211a and 212a are connected mutually by means of TIG welding or the like.

As mentioned above, by providing such a modified structural arrangement that the joint part 211a of the terminal conductor 211 on the outer circumferential side is bent radially outwardly along the wide side face thereof, even a thick flat-type conductor can be bent easily without causing a large space to be occupied by the bending formation. It is therefore possible to contain the connected joint parts in a vacant space available on the core back so that the connected joint parts do not protrude from the stator iron core 412. In this connection structure, there is provided a total coil end height consisting of the height of the coil end 220 before joint connection and the substantial width of one conductor terminal 212, enabling reduction in coil end height.

While the conductor terminal 211 on the outer circumferential side is curved spiral-wise toward the conductor terminal 212 on the inner circumferential side and then the conductor terminal 212 is bent radially outwardly along the upper end face of the coil end 220 in the example demonstrated in FIGS. 14(a)-14(b), there may also be provided a modified arrangement in which the conductor terminal 212 on the inner circumferential side is curved spiral-wise toward the conductor terminal 211 on the outer circumferential side and then the conductor terminal 211 is bent radially inwardly along the upper face of the coil end 220 for joint connection.

Figure 15:
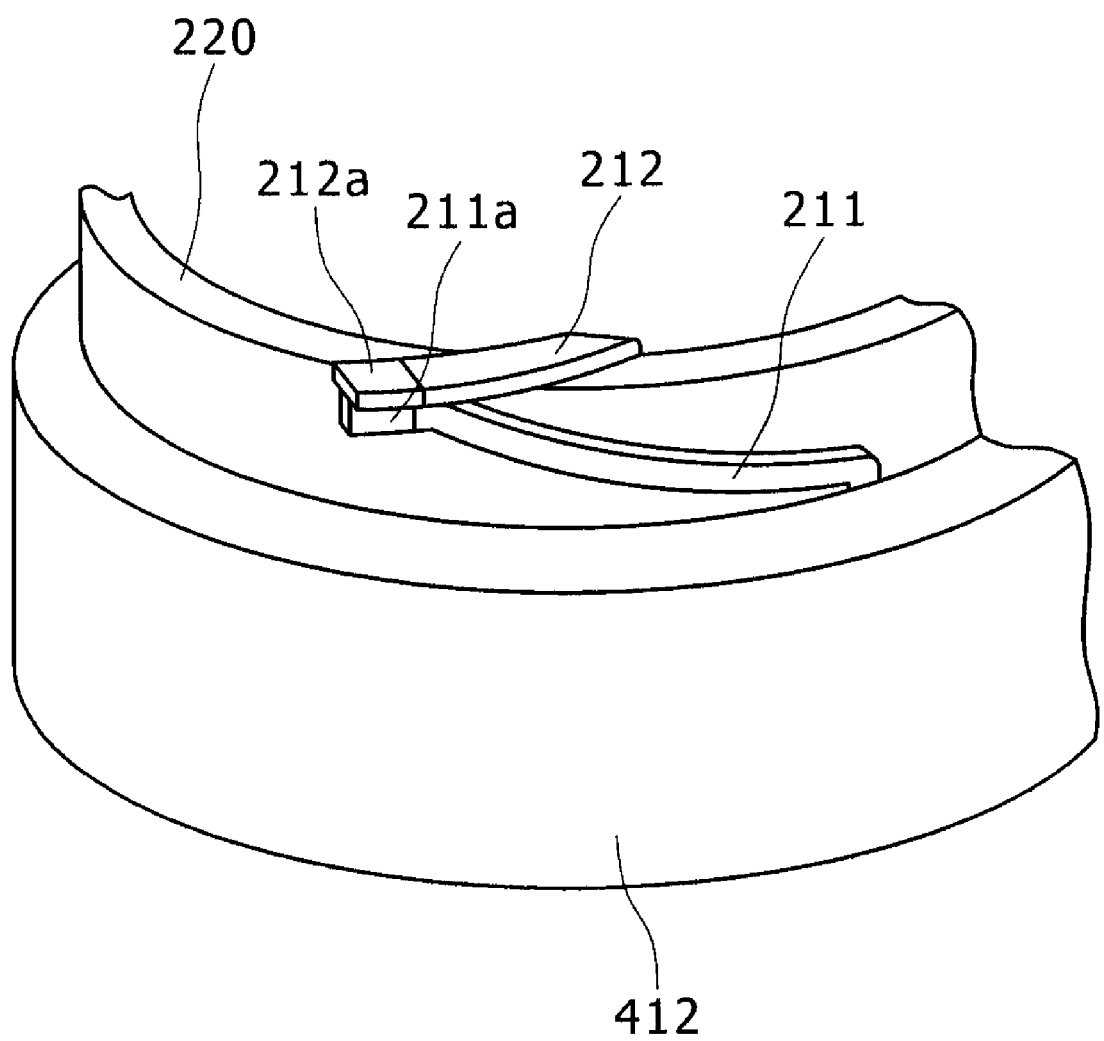
FIG. 15 is a diagram showing an exemplary modified form of the seventh connection structure.

Referring to FIG. 15, there is shown a modified form of the seventh connection structure shown in FIGS. 14(a)-14(b). While the conductor terminal 212 on the inner circumferential side of the coil end 220 is bent radially outwardly along the upper end face of the coil end 220 in the example demonstrated in FIGS. 14(a)-14 (b), the conductor terminal 212 is skewed with respect to the radially outward direction toward the conductor terminal 211. By skewing the conductor terminal 212 in the bending thereof, it is possible to decrease the extent of protrusion of the conductor terminals in the radially outward direction from the circumference of the coil end 220. Further, in cases where the extent of protrusion of the conductor terminals is almost equal to that in the seventh connection structure shown in FIGS. 14(a)-14(b), the length of the joint parts can be made longer for ensuring reliable connection thereof.

Figure 16:
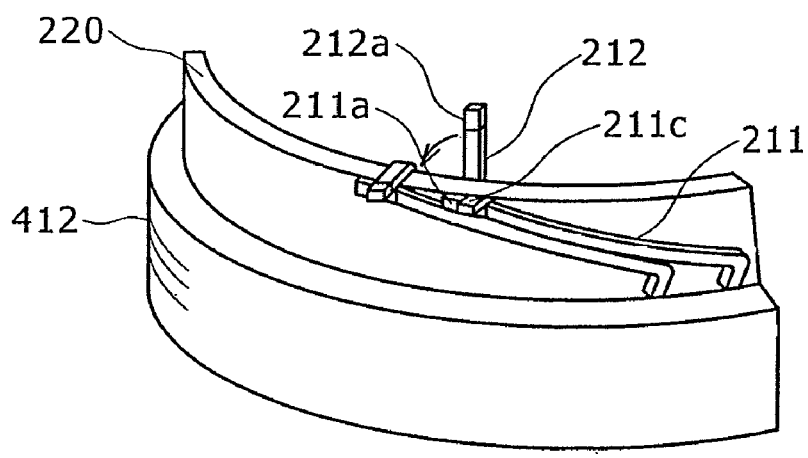
FIGS. 16(a)-16(b) are explanatory diagrams showing an eighth connection structure of the conductor terminals 211 and 212.
Figure 16:
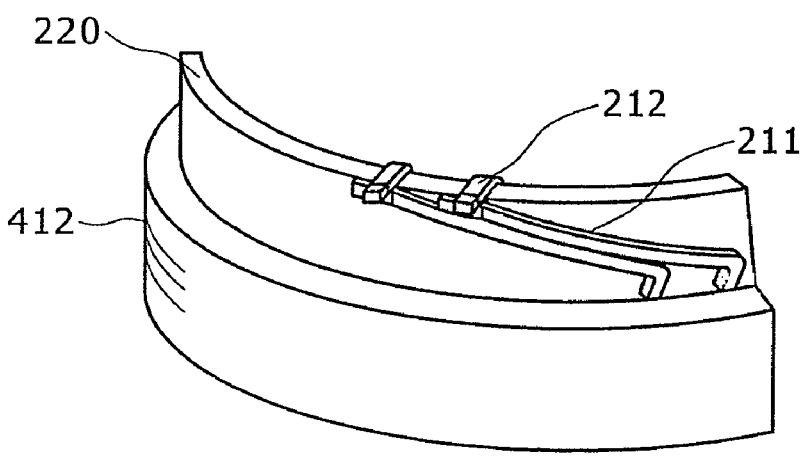

An Eighth Connection Structure:

Referring to FIGS. 16(a)-16(b), there is shown an explanatory diagram of an eighth connection structure of the conductor terminals 211 and 212 according to another preferred embodiment of the present invention. In the eighth connection structure, a notch 211c is formed on the joint part 211a of the conductor terminal 211 to be curved spiral-wise along the coil end 220. For connection of the joint parts 211a and 212a, the conductor terminal 211 on the outer circumferential side of the coil end 220 is first curved spiral-wise along the coil end 220 as shown in FIG. 16(a).

As mentioned above, the notch 211c is formed on the joint part 211a of the conductor terminal 211 beforehand; more specifically, the notch 211 is formed on the short side of the rectangular section of the joint part 211a of the conductor terminal 211. It is to be noted that the width and depth of the notch 211c are adjusted according to the width and thickness of the conductor terminal 211 on the inner circumferential side of the coil end 220. The conductor terminal 211 is curved spiral-wise so that the notch 211c is opposed to the conductor terminal 212 as shown in FIG. 16(a).

Then, the conductor terminal 212 is bent radially outwardly along the upper end face of the coil end 220, the joint part 212a is engaged into the notch 211c of the joint part 211a, and then the conductor terminals 211 and 212 are positioned properly. Thereafter, the joint parts 212a and 211a are connected mutually by means of TIG welding or the like.

In the eighth connection structure, there is also provided a total coil end height consisting of the height of the coil end 220 itself before joint connection and the substantial width of one conductor terminal 212, making it possible to realize reduction in coil end height. Further, since the notch 211c is provided, the conductor terminals 211 and 212 can be positioned easily, thereby allowing the elimination of the need for a positioning jig or device at the time of joint connection. Still further, it is possible to decrease the extent of protrusion of the conductor terminals in the radially outward direction from the circumference of the coil end 220.

Figure 17A:
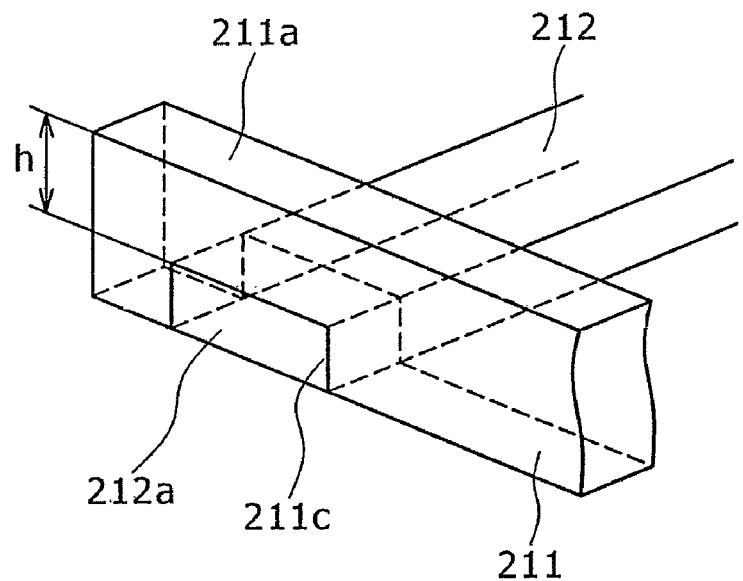
FIGS. 17(a)-17(b) are diagrams of exemplary modified forms of the eighth connection structure, showing a first modified form in FIG. 17(a), and a second modified form in FIG. 17(b).
Figure 17B:
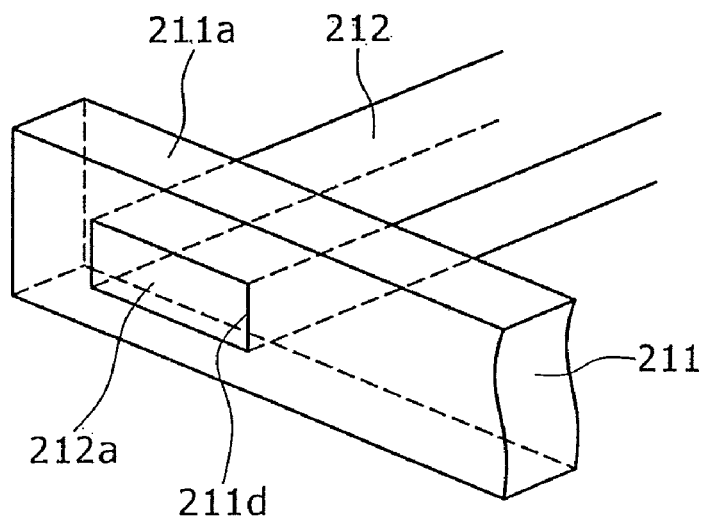

Referring to FIGS. 17(a)-17(b), there are shown exemplary modifications of the eighth connection structure. FIG. 17(a) shows a first exemplary modification in which the notch 211c is formed on the lower side face of the joint part 211a. In this case, although the positioning of the conductor terminals 211 and 212 can also be made reliably to facilitate welding work, a dimension "h" indicated in FIG. 17(a) causes an increase in height at a connected point of the joint part 212a. In a second exemplary modification shown in FIG. 17(b), a through hole 211d is formed in the joint part 211a instead of the notch 211c, and the joint part 212a is inserted into the through hole 211d.

Conversely to the arrangement shown in FIGS. 16(a)-16(b), there may also be provided such a modified arrangement that a notch or a through hole is formed on the conductor terminal 212, the conductor terminal 212 is curved spiral-wise along the coil end 220, and then the conductor terminal 211 on the outer circumferential side is bent in the radially inward direction. Further, while the notch 211c and the through hole 211d each having a rectangular shape corresponding to the rectangular cross section of the conductor as shown in FIG. 16(a) are used respectively in the exemplary arrangements mentioned above, each of the notch 211c and the through hole 211d may be shaped in such a form as a trapezoid, triangle, circular arc sector, and elliptic arc sector according to the shape of the cross section of a conductor wire material to be used.

According to the preferred embodiments that have been described so far, it is also practicable to provide the following modifications as regards the applicability of the present invention to rotating electric apparatus:
(1) While the induction-type rotating electric apparatus having eight poles is taken as an example in the preferred embodiments described above, the present invention is also applicable to a stator winding of a permanent-magnet type of rotating electric apparatus or the like.
(2) Further, the present invention is applicable to a stator winding of a generator.
(3) Still further, the present invention is applicable to a round conductor wire material, not limited to a conductor wire material having a rectangular cross-sectional shape.
(4) Furthermore, while the lap winding type of distributed winding arrangement is taken as an example of stator winding in the preferred embodiments described above, the present invention is applicable to a winding arrangement in which conductor terminals to be connected are disposed separately on the inner circumferential side and outer circumferential side of the coil end 220, such as a wave winding arrangement, for example.

It is to be understood that the present invention is not limited by any of the details of description concerning the preferred embodiments in the foregoing unless otherwise any of the features of the invention is impaired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. A rotating electric apparatus comprising:
a stator having a stator winding comprising a plurality of coils connected in a plurality of slots formed in a stator iron core; and
a rotor rotatably disposed in the inside of said stator; wherein, each pair of coils mutually connected in said stator winding is arranged in a fashion that
a first coil of each said pair of coils has a top-side coil terminal at a top-side position of said slot, said top-side coil terminal being led out in the direction of a coil end of said stator winding; and
a second coil of each said pair of coils has a bottom-side coil terminal at a bottom-side position of said slot said bottom-side coil terminal being led out in the direction of said coil end of said stator winding for connection to said top-side coil terminal;
there is provided a coil terminal connection structure in which said top-side coil terminal and said bottom-side coil terminal are connected mutually across said coil end, and joint parts of said top-side coil terminal and said bottom-side coil terminal thus connected are bent so that said joint parts are disposed close to said coil end;
each one of said top-side coil terminal and said bottom-side coil terminal is laid spiral-wise across said coil end to a position of the other one of said top-side and bottom-side coil terminals;
side faces of joint parts of said top-side and bottom-side coil terminals are connected mutually in a fashion such that end faces of said joint parts of said top-side and bottom-side coil terminals are oriented in mutually opposite directions; and
said joint parts thus connected are disposed close to said coil end.
2. A rotating electric apparatus comprising:
a stator having a stator winding comprising a plurality of coils connected in a plurality of slots formed in a stator iron core; and
a rotor rotatably disposed in the inside of said stator; wherein,
each pair of coils mutually connected in said stator winding is arranged in a fashion that
a first coil of each said pair of coils has a top-side coil terminal at a top-side position of said slot, said top-side coil terminal being led out in the direction of a coil end of said stator winding; and
a second coil of each said pair of coils has a bottom-side coil terminal at a bottom-side position of said slot, said bottom-side coil terminal being led out in the direction of said coil end of said stator winding for connection to said top-side coil terminal;

there is provided a coil terminal connection structure in which either one of said top-side coil terminal and said bottom-side coil terminal is extended through a coil-to-coil clearance on said coil end to a position of the other one of said top-side and bottom-side coil terminals, and said one of said top-side and bottom-side coil terminals thus extended is connected to the other one of said top-side and bottom-side coil terminals;

in a case where said top-side coil terminal is led out to a position of a bottom-side coil terminal, joint parts of said top-side coil terminal and said bottom-side coil terminal are bent radially inwardly with respect to said stator iron core; and in a case where said bottom-side coil terminal is led out to a position of said top-side coil terminal, joint parts of said top-side coil terminal and said bottom-side coil terminal are bent radially outwardly with respect to stator iron core.

3. A rotating electric apparatus comprising:

a stator including a stator iron core that has a plurality of slots formed thereon, and a stator winding that comprises a plurality of coils held in said plurality of slots; and a rotor having a face opposed to a face of said stator iron core mutually, said rotor being held rotatably via an air gap so that there is produced a magnetic circuit through which a magnetic flux is passed between the mutually opposed faces of said stator iron core and said rotor via said air gap; wherein, each pair of coils mutually connected in said stator winding is arranged in a fashion that one of each said pair of coils has a top-side coil terminal at a top-side position of said slot, said top-side coil terminal being led out in the direction of a coil end of said stator winding; and the other one of each said pair of coils has a bottom-side coil terminal at a bottom-side position of said slot, said bottom-side coil terminal being led out in the direction of said coil end of said stator winding for connection to said top-side coil terminal;

either one of said top-side coil terminal and said bottom-side coil terminal is laid spiral-wise along said coil end to a position of the other one of said top-side and bottom-side coil terminals so that said one of said top-side and bottom-side coil terminals is connected to the other one of said top-side and bottom-side coil terminals;

in a case where said top-side coil terminal is laid spiral-wise to a position of said bottom-side coil terminal, joint parts of said top-side coil terminal and said bottom-side coil terminal are bent radially inwardly with respect to said stator iron core; and in a case where said bottom-side coil terminal is laid spiral-wise to a position of said top-side coil terminal, joint parts of said top-side coil terminal and said bottom-side coil terminal are bent radially outwardly with respect to said stator iron core.

4. A rotating electric apparatus as claimed in claim 3, wherein joint parts of said top-side coil terminal and said bottom-side coil terminal are bent in a fashion that said joint parts are folded back to one of said top-side and bottom-side coil terminals that is laid spiral-wise along said coil end.

5. A rotating electric apparatus comprising:

a stator having a stator winding comprising a plurality of coils connected in a plurality of slots formed in a stator iron core; and a rotor rotatably disposed in the inside of said stator;

wherein each pair of coils mutually connected in said stator winding is arranged in a fashion that, a first coil of each said pair of coils has a top-side coil terminal at a top-side position of said slot, said top-side coil terminal being led out in the direction of a coil end of said stator winding; and a second coil of each said pair of coils has a bottom-side coil terminal at a bottom-side position of said slot, said bottom-side coil terminal being led out in the direction of said coil end of said stator winding for connection to said top-side coil terminal;

wherein one of said top-side coil terminal and said bottom-side coil terminal is laid spiral-wise along said coil end of said stator winding, and an opening selected from a notch and a through hole is formed on a joint part of said one of said top-side and bottom-side coil terminals, and wherein the other one of said top-side and bottom-side coil terminals is bent radially across said coil end, and a joint part of the other one of said top-side and bottom-side coil terminals is engagedly connected to said opening formed on said joint part of said one of said top-side and bottom-side coil terminals.

6. A rotating electric apparatus comprising:

a stator having a stator winding comprising a plurality of coils connected in a plurality of slots formed in a stator iron core; and a rotor rotatably disposed in the inside of said stator;

wherein each pair of coils mutually connected in said stator winding is arranged in a fashion that, a first coil of each said pair of coils has a top-side coil terminal at a top-side position of said slot, said top-side coil terminal being led out in the direction of a coil end of said stator winding; and a second coil has a bottom-side coil terminal at a bottom-side position of said slot, said bottom-side coil terminal being led out in the direction of said coil end of said stator winding for connection to said top-side coil terminal;

wherein said stator winding is formed of a flat-type conductor wire material having a rectangular cross section, with a wide side face of said flat-type conductor wire material corresponding to the long side of said rectangular cross section, and with a narrow side face of said flat-type conductor wire material corresponding to the long side of said rectangular cross section, wherein one of said top-side coil terminal and said bottom-side coil terminal is laid spiral-wise along said coil end of said stator winding, wherein a joint part of said one of said top-side and bottom-side coil terminals is bent radially with respect to said stator, and wherein the other one of said top-side and bottom-side coil terminals is bent radially across said coil end so that the wide side face of the other one of said top-side and bottom-side coil terminals is connected to the narrow side face of said one of said top-side and bottom-side terminals.

* * * * *